United States Patent [19]

Arnold

[11] Patent Number: 5,787,172
[45] Date of Patent: Jul. 28, 1998

[54] APPARATUS AND METHOD FOR ESTABLISHING A CRYPTOGRAPHIC LINK BETWEEN ELEMENTS OF A SYSTEM

[75] Inventor: Terry Sutton Arnold, San Diego, Calif.

[73] Assignee: The Merdan Group, Inc., San Diego, Calif.

[21] Appl. No.: 201,399

[22] Filed: Feb. 24, 1994

[51] Int. Cl.$^6$ .................. H04L 9/12; H04N 7/16
[52] U.S. Cl. .................. 380/21; 380/20; 380/23; 380/30
[58] Field of Search .................. 380/30, 23, 20, 380/25, 24, 21

[56] References Cited

U.S. PATENT DOCUMENTS 4,200,770  4/1980  Hellman et al. .
4,218,582  8/1980  Hellman et al. .

(List continued on next page.)

FOREIGN PATENT DOCUMENTS

0155762 A3  9/1985  European Pat. Off. .
0535863 A3  4/1993  European Pat. Off. .

OTHER PUBLICATIONS

C Mitchell, et al., (1989) "CCITT/ISO Standards For Secure Message Handling", *I.E.E.E. Journal on Selected Areas in Commun.* 7(4):517–523.

J. Press, (1989) "An Introduction To Public Key Systems And Digital Signatures", *ICL Technical Journal* 6(4):681–693.

B. Kaliski, Privacy Enhancement for Internet Electronic Mail: Part IV: Key Certification and Related Services, RSA Laboratories,Feb. 1993.

S. Kent, Privacy Enhancement for Internet Electronic Mail: Part II: Certificate–Based Key Management, RSA Laboratories, Feb. 1993.

Proceedings, 1989 IEEE Computer Society Symposium on Security and Privacy, IEEE Computer Society, May 1–3, 1989, Oakland, California.

Teletrust: Smart Card Access to Services, Karl Rihaczek and Bruno Struif, Smart Card 2000, Proceedings of the IFIP WG 11.6 International Conference, Laxenburg, Austria, 1989.

Privacy and Authentication: An Introduction to Cryptography, Whitfield Diffie and Martin E. Hellman, Proceedings of the IEEE, vol. 67, No. 3, Mar. 1979, pp. 397–427.

A Method for Obtaining Digital Signatures and Public Key Cryptosystems, Ronald L. Rivest, Adi Shamir and Leonard M. Adleman, Communications of the ACM, vol. 21, No. 2, Feb. 1978, pp. 217–239.

(List continued on next page.)

*Primary Examiner*—Gilberto Barrón, Jr.
*Attorney, Agent, or Firm*—Knobbe, Martens, Olson, & Bear, LLP

[57] ABSTRACT

A secure cryptographic network is established among operational units in a system. A public key cryptosystem is initially used to establish secure communication links. Then, each secure communication link will be provided with a unique private encryption key from a private key cryptosystem. Every operational unit in the system will comprise a secure chip integrated circuit. These secure chips will comprise a programmable processor and a read-only memory. A plurality of personalization stations are used to provide each secure chip with a public/private encryption or signature key pair. The secure chips will execute a program from the read-only memory on the secure chips to verify that the public/private key pair has been received from an authorized source. Each secure chip will also be provided with a chain of authentication certificates originating from a trusted authority. The public signature key of the trusted authority will be programmed into the read-only memory of the secure chip, for reliable access to this information. When establishing a secure communication link between two operational units, each of the operational units will authenticate the other operational unit by verifying the content and source of each of the authentication certificates in the respective chains.

35 Claims, 12 Drawing Sheets

U.S. PATENT DOCUMENTS

| | | |
|---|---|---|
| 4,309,569 | 1/1982 | Merkle . |
| 4,376,299 | 3/1983 | Rivest . |
| 4,405,829 | 9/1983 | Rivest et al. . |
| 4,424,414 | 1/1984 | Hellman et al. . |
| 4,529,870 | 7/1985 | Chaum ............................................ 380/23 |
| 4,531,021 | 7/1985 | Bluestein et al. . |
| 4,531,929 | 7/1985 | Wechselberger et al. . |
| 4,533,948 | 8/1985 | McNamara et al. . |
| 4,567,600 | 1/1986 | Massey et al. . |
| 4,587,627 | 5/1986 | Omura et al. . |
| 4,613,901 | 9/1986 | Gilhousen et al. . |
| 4,633,036 | 12/1986 | Hellman et al. . |
| 4,634,808 | 1/1987 | Moerder . |
| 4,638,356 | 1/1987 | Frezza . |
| 4,658,093 | 4/1987 | Hellman . |
| 4,670,857 | 6/1987 | Rackman ............................................ 380/4 |
| 4,694,491 | 9/1987 | Horne et al. . |
| 4,712,238 | 12/1987 | Gilhousen et al. . |
| 4,748,668 | 5/1988 | Shamir et al. . |
| 4,771,461 | 9/1988 | Matyas . |
| 4,792,973 | 12/1988 | Gilhousen et al. . |
| 4,803,725 | 2/1989 | Horne et al. . |
| 4,807,286 | 2/1989 | Wiedemer . |
| 4,811,393 | 3/1989 | Hazard . |
| 4,843,026 | 6/1989 | Ong et al. ............................................ 437/51 |
| 4,864,615 | 9/1989 | Bennett et al. . |
| 4,881,264 | 11/1989 | Merkle . |
| 4,885,777 | 12/1989 | Takargi et al. . |
| 4,888,801 | 12/1989 | Foster et al. ............................................ 380/21 |
| 4,891,781 | 1/1990 | Omura . |
| 4,916,737 | 4/1990 | Chomet et al. . |
| 4,926,479 | 5/1990 | Goldwasser et al. . |
| 4,932,056 | 6/1990 | Shamir . |
| 4,933,970 | 6/1990 | Shamir . |
| 4,982,430 | 1/1991 | Frezza et al. . |
| 4,995,082 | 2/1991 | Schnorr . |
| 5,001,753 | 3/1991 | Davio et al. . |
| 5,003,591 | 3/1991 | Kauffman et al. . |
| 5,003,593 | 3/1991 | Mihm, Jr. . |
| 5,003,597 | 3/1991 | Merkle . |
| 5,029,207 | 7/1991 | Gammie . |
| 5,033,084 | 7/1991 | Beecher . |
| 5,048,087 | 9/1991 | Trbovich et al. . |
| 5,054,067 | 10/1991 | Moroney et al. . |
| 5,077,790 | 12/1991 | D'Amico et al. . |
| 5,081,677 | 1/1992 | Green et al. . |
| 5,091,938 | 2/1992 | Thompson et al. . |
| 5,093,860 | 3/1992 | Steinbrenner et al. . |
| 5,093,921 | 3/1992 | Bevins, Jr. . |
| 5,103,476 | 4/1992 | Waite et al. . |
| 5,111,504 | 5/1992 | Esserman et al. . |
| 5,115,466 | 5/1992 | Presttun . |
| 5,115,467 | 5/1992 | Esserman et al. . |
| 5,134,700 | 7/1992 | Eyer et al. . |
| 5,136,643 | 8/1992 | Fischer ............................................ 380/30 |
| 5,140,634 | 8/1992 | Guillou et al. . |
| 5,144,664 | 9/1992 | Esserman et al. . |
| 5,144,667 | 9/1992 | Pogue, Jr. et al. . |
| 5,146,497 | 9/1992 | Bright . |
| 5,146,498 | 9/1992 | Smith . |
| 5,150,401 | 9/1992 | Ashby, III et al. . |
| 5,150,408 | 9/1992 | Bright . |
| 5,150,411 | 9/1992 | Maurer ............................................ 380/30 |
| 5,153,919 | 10/1992 | Reeds, III et al. . |
| 5,163,154 | 11/1992 | Bournas et al. . |
| 5,164,986 | 11/1992 | Bright . |
| 5,164,988 | 11/1992 | Matyas et al. . |
| 5,166,978 | 11/1992 | Quisquater . |
| 5,173,938 | 12/1992 | Steinbrenner et al. . |
| 5,185,795 | 2/1993 | Bright . |
| 5,208,856 | 5/1993 | Leduc et al. . |
| 5,208,858 | 5/1993 | Vollert et al. . |
| 5,208,859 | 5/1993 | Bartucci et al. . |
| 5,210,710 | 5/1993 | Omura . |
| 5,214,701 | 5/1993 | Quisquater et al. . |
| 5,214,702 | 5/1993 | Fischer . |
| 5,216,715 | 6/1993 | Markwitz . |
| 5,218,637 | 6/1993 | Angebaud et al. . |
| 5,220,603 | 6/1993 | Parker . |
| 5,222,140 | 6/1993 | Beller et al. . |
| 5,224,163 | 6/1993 | Gasser et al. ............................................ 380/30 |
| 5,237,611 | 8/1993 | Rasmussen et al. ............................................ 380/21 |
| 5,272,755 | 12/1993 | Miyaji et al. ............................................ 380/30 |
| 5,341,426 | 8/1994 | Barney et al. ............................................ 380/21 |
| 5,446,796 | 8/1995 | Ishiguro et al. ............................................ 380/24 |
| 5,450,489 | 9/1995 | Ostrover et al. ............................................ 380/3 |
| 5,473,692 | 12/1995 | Davis ............................................ 380/25 |

OTHER PUBLICATIONS

Federal Information Processing Standards Publication, FIPS PUB XX, Digital Signature Standard (DSS), Feb. 1, 1993.

Federal Information Processing Standards Publication, FIPS PUB 180, Secure Hash Standards, May 11, 1993.

Gustavus J. Simmons, Contemporary Cryptology, The Science of Information Integrity, 1992, IEEE Press.

Bruce Schneier, Applied Cryptography, 1994, John Wiley & Sons, Inc.

APPARATUS AND METHOD FOR ESTABLISHING A CRYPTOGRAPHIC LINK BETWEEN ELEMENTS OF A SYSTEM

BACKGROUND OF THE INVENTION

1. Field of the Invention

The present invention is in the field of cryptographic methods for establishing a cryptographic link for communication of information between elements of a system. In particular, the present invention relates to a system and method for exchanging cryptographic keys between elements in a system to create a cryptographic network where each element of the system authenticates the other elements of the system with which it will communicate.

2. Description of the Related Art

A cryptographic system typically involves the application of an encryption algorithm to a plain text message to create cipher text, which cannot be understood without performing a corresponding decryption function. A relatively simple cryptosystem utilizes the same algorithm for both encryption and decryption functions. Using such a system requires that the algorithm be disseminated to elements of the system, without disclosing the algorithm to outsiders.

A slightly more sophisticated cryptographic system will typically involve an algorithm that operates on a key to encrypt or decrypt messages, so that an outsider cannot decrypt a message without determining both the algorithm and the key. In such a system, selecting a new key is typically much easier than selecting a new algorithm. Thus, if the security of the system has been compromised, a secure path can be reestablished by securely transferring a new key, without having to develop a new algorithm. Hence, the security of the system does not rely on the privacy of the algorithm. A cryptosystem of this type will be referred to as a private key cryptosystem. One such system, the "DES" system, is disclosed in the "Data Encryption Standard," *Federal Information Processing Standards* Publication No. 46, Jan. 15, 1977, which is incorporated herein by reference. Use of these private key systems, however, still requires that a key be privately communicated between elements of the system, which typically requires costly and time-consuming measures to ensure that outsiders do not intercept a message containing a new key.

A public key cryptosystem provides a secure link without having to privately transfer keys among elements of the system. Such a system involves a pair of inverse transformations for encrypting and decrypting a message. Applying one of the transformations to ciphertext that has been encrypted by the other transformation will yield the original plain text message. Again, each of the transformations can involve the application of a common algorithm to a unique key to provide a unique transformation. Thus, a first algorithm and a first key combine to form a first transformation, while a second algorithm and a second key form a second transformation, where the two transformations are inverse functions.

In a public key cryptosystem, each element in the system will have a pair of keys that, along with the appropriate algorithms, provide the inverse functions of encryption and decryption. One of the keys, the public key, is distributed to other elements in the system, without taking any measures to prevent outsiders from acquiring the key. The other key, the private key, is retained by the element to which the keys belong, and this key should not be disclosed for any reason. Thus, neither of the keys have to be privately communicated to other elements of the system. The algorithms and keys used in such a cryptosystem must be selected to render infeasible the determination of a private key, based on knowledge of the corresponding public key. The prior art discloses several thoroughly tested public key cryptosystems that meet these requirements. For example, U.S. Pat. No. 4,405,829, issued to Rivest, et al., which is hereby incorporated by reference, discloses a well-known public cryptosystem commonly referred to as the RSA cryptosystem.

To further explain the use of a public key cryptosystem, suppose that elements A and B desire to establish a secure link. Element A will generate a public/private key pair, transmit the public key to element B, and retain the private key to itself. Element B will generate its own public/private key pair, transmit its public key to element A, and retain its own private key. If element A now wants to send a private message to element B, element A will encrypt a plaintext message using the public key of element B. The resulting ciphertext can only be decrypted by using element B's private key. Because only element B has this private key, only element B can decrypt the ciphertext to obtain the original message. In the same manner, element B can send a private message to element A by encrypting the message with element A's public key. Thus, elements A and B have established a secure link by swapping public keys.

The above description of the use of a public key cryptosystem allows for private transfer of messages between elements of a system. Another use of a public key cryptosystem allows elements of a system to verify the source of a message. In the above example, if element A encrypts a message with its own private key and sends the message to element B, then element B can verify that the message came from element A by applying A's public key to decrypt the message. Any message that can be decrypted using A's public key must have been encrypted by A because only A has the corresponding private key. This use of a public key cryptosystem is called a digital signature system. Several public key cryptosystems have been developed specifically for this purpose. For example, the *Digital Signature Standard* (DSS), which is published by the National Institute of Standards and Technology (FIPS PUB XX, Feb. 1, 1993), describes one such system. The DSS is also incorporated by reference.

The two uses of public key cryptosystems described above can be referred to as "privacy" and "authentication," respectively. Both of these uses are subject to an important limitation. The privacy and authentication objectives can only be achieved if an element obtains the correct public key for the element with which it wishes to communicate. In the example described above, an outsider X may pretend to be a true element of the system, element C for example, and send a public key to element A. Element A, believing the outsider to be element C, may send its public key to the outsider X. Then, if element A intends to send a private message to element C, element A will encrypt the plaintext message using the public key of the outsider X, believing it to be the public key of element C. Element A will then transmit the ciphertext to the outsider X, again believing the outsider X to be element C. Thus, the outsider can simply apply its own private key to decipher the cipher text. In addition, outsider X can sign a message with its own private key and send the message to element A. Element A will apply the public key of outsider X, believing it to be the public key of element C. Because the keys will correspond, element A will believe that the message was signed by element C.

One solution to the above-described problem with public key cryptosystems involves the use of certificates generated by a mutually trusted authority. In the example described above, assume that each of the elements of the system will trust an authority T to recognize the different elements of the system. Each of the elements of the system can become authenticated by the authority T. To obtain authentication, element A will provide its public key to the authority T. After verifying that the public key belongs to element A, the authority T will sign, using its own private key, a message containing the public key of element A. The authority T will then provide this signed message, in the form of a certificate, to element A. Element A can now provide the certificate to other elements of the system to prove that its public key was recognized by the authority T.

When attempting to establish a secure link with another element, for example, element B, element A will transmit the certificate to element B. Element B will use the public key of the authority T to decrypt the certificate and verify the public key of element A. Now, as long as element B can trust the decision by authority T to authenticate the public key of element A, element B can trust the results of using the public key of element A for privacy and authentication functions. However, if element B does not have the true public key of the authority T, then the security of the system may also be compromised. This is an important weakness in many existing cryptosystems.

In theory, a private key cryptosystem can serve the functions of privacy and authentication very well. However, in practice, many implementations of these systems have been compromised. Pirates are often very sophisticated and will often go to great lengths to break into a cryptosystem. Many implementations of cryptographic systems have utilized expensive security measures to safeguard against pirates. For example, systems are often set up to require that two specific people be present simultaneously to perform certain sensitive functions. In many situations, however, such security measures would be prohibitively expensive. Consequently, many systems for which the market does not justify such expenditures are vulnerable to pirate attacks.

In addition, a public key cryptosystem will only be secure, even in theory, if computing a private key, based on knowledge of a corresponding public key, is computationally infeasible. Although the prior art discloses several systems that have been thoroughly tested, and appear to satisfy this requirement, these systems also require substantial processing capabilities to originally generate a public/private key pair. Providing the required processing capabilities can again be prohibitively expensive, especially when a large number of public key pairs is required for a large number of units in a system. There is a need in the cryptography industry for a secure, but relatively inexpensive cryptographic system.

SUMMARY OF THE INVENTION

The present invention comprises a method and apparatus for establishing a cryptographic network among a plurality of operational units in a system. In addition to the operational units, the system also comprises cryptographic units for establishing the cryptographic network. These cryptographic units comprise a master key station (MKS), an MKS registration station (MKS-RS), an MKS personalization station (MKS-PS) and a personalization station (PS). At least one of the operational units in the system will function as a registration station (RS). Typically there will be a number of PSs and a number of RSs distributed throughout a system. There may also be a separate operational unit associated with an RS, for which the RS performs registrations. Every unit in the system, except possibly the MKS, comprises a secure chip integrated circuit, which, in turn, comprises a programmable processor and a read-only memory (ROM). The method of the present invention generally involves an initialization of the MKS, a personalization of each of the secure chips that will be used in the system, and a registration of the operational units in the system.

The MKS functions as a trusted authority and directly or indirectly authenticates every secure chip in the system. The MKS, along with the MKS-PS and the MKS-RS, will typically be located in a very secure environment. First, the MKS generates a public/private signature key pair for its own use, designated the MKS public signature key and the MKS private signature key. The MKS public signature key is programmed into the ROM of each secure chip when the secure chips are manufactured, so that each secure chip will have reliable access to the MKS public signature key.

The MKS personalizes the secure chips for the PS, the MKS-PS and the MKS-RS. During personalization, a personalizing unit, such as the MKS here, provides the secure chip with a public/private signature key pair, designated the SC public signature key and the SC private signature key. The personalizing unit also provides the secure chip with an authentication certificate. An authentication certificate generally contains the SC public signature key and a message indicating the functions that the secure chip has been authorized to perform by the personalizing unit. Finally, the certificate is also signed by the personalizing unit. After personalizing the secure chip, the personalizing unit deletes any copy of the SC private signature key that the personalizing unit has retained. During personalization, the secure chip that is being personalized will execute a program that is contained within the ROM on the secure chip. The execution of this program will verify that the secure chip is being personalized by an authorized personalizing unit. If the personalizing unit is not authorized, then the secure chip will abandon the personalization process. After a secure chip has been successfully personalized, then the secure chip will execute a software locking routine that will prevent any future tampering with the information that has been received by the secure chip during the personalization process. The MKS authorizes the MKS-PS and the PS to personalize other secure chips; and the MKS authorizes the MKS-RS to register operational units. When the secure chips for the PS, the MKS-PS and the MKS-RS have been personalized, then these units can be assembled. Electronic links can be established between these units and the MKS. Then all four of these units can begin to operate.

The MKS-PS and the PS will personalize the remaining secure chips to be used in the system. Most of the secure chips will typically be personalized by the PS (or the multiple PSs). This can reduce the cost of the personalization process because the secure chips will not all have to be transported to a single location for personalization. Generally, the MKS-PS will only be used to personalize the secure chips of the operational units that are most sensitive to pirate attacks, including the RS. A similar rationale applies to the determination as to whether the MKS-RS or the RS (or the multiple RSs) will register an operational unit. The personalization process performed by the MKS-PS will be similar to the personalization described above relative to the MKS. The personalization process performed by the PS will also be similar to that performed by the MKS, except that the secure chips will also be provided with a public/private encryption key pair, designated the public rekey key and the private rekey key. The public rekey key is included in the authentication certificate, along with the SC public signature key.

After all of the secure chips have been personalized, then all of the operational units can be assembled and electronic links can be established between these operational units. However, the operational units will typically not be able to fully operate until some or all of the operational units have registered with either the RS or the MKS-RS.

During registration of these operational units, the unit being registered (the subject of registration) will provide its public rekey key and a chain of authentication certificates to the registering unit. The chain of certificates will comprise one certificate from the MKS, authenticating the PS, and one certificate from the PS, authenticating the subject. The registering unit will authenticate the subject by verifying the content and source of these certificates. Next, the registering unit will generate a private encryption key, designated a CSKEY, or a package of several keys, that will be unique to the subject of the registration. The registering unit will encrypt this CSKEY using the subject's public rekey key. The registering unit will then send the encrypted CSKEY and a chain of authentication certificates to the subject. The chain of certificates will comprise one certificate from the MKS, authenticating the MKS-PS, and one certificate from the MKS-PS, authenticating the registering unit, if the registering unit is the RS. Alternatively, if the registering unit is the MKS-RS, then the chain of certificates will comprise one certificate from the MKS, authenticating the MKS-RS. The subject of the registration will authenticate the registering unit by verifying the content and source of these certificates. The subject will also decrypt the CSKEY by applying the private rekey key of the subject.

The MKS-RS will be performing these registrations on behalf of the MKS. Also, as described above, the RS may be performing the registrations on behalf of another operational unit. If the registration is being performed on behalf of another unit, then the registering unit will securely transmit the unique CSKEY to that unit. Then the registering unit will delete any copy of the CSKEY that the registering unit has retained. If the registration was not performed on behalf of another unit, then the RS will retain the CSKEY.

The registration of an operational unit establishes a secure link between the operational unit and the unit for which the registration was performed. Only these two units have access to the unique CSKEY, and so each of the units can encrypt and decrypt private messages using this key. This remote registration capability eliminates the "cradle to grave" tracking required by many prior art cryptographic systems. In the event that the CSKEYs of one or more secure devices are compromised, the secure devices can be commanded to register again rather than the expensive "smart-card" deployment required by many prior art cryptographic systems. The registration process can be performed once for every pair of units for which a secure electronic link is desired. The CSKEY can take the place of the unique keys installed during manufacture in many prior art cryptographic systems, especially those used in the cable and direct broadcast TV industry.

The method and apparatus of the present invention provides significant advantages over prior art cryptographic systems. The present invention provides one or more personalization stations that generate public/private key pairs for operational units in the system, so that the operational units do not need to have the processing capability to generate their own key pairs. This provision can yield great cost savings for systems with numerous operational units. Also, for systems with relatively small operational units, this provision can greatly reduce the size of these units.

The present invention also provides numerous relatively inexpensive security measures that are not disclosed by the prior art. For example, the MKS public signature key is placed in ROM of the secure chips so that every unit in the system will have reliable access to this information. This prevents pirates from imitating the MKS, without obtaining the MKS private signature key. A portion of the personalization routine is also placed in ROM of the secure chips so that pirates cannot personalize secure chips using an unauthorized personalizing unit, by bypassing the authentication and authorization checking functions of the personalization process. Another feature of the present invention is that each unit involved in both the personalization process and the registration process authenticates the opposing unit in the process. This significantly complicates the difficulty of a pirate breaking into a system, without significantly increasing the cost of implementing and maintaining the system. The present invention also provides for remote registration of operational units to further reduce the cost of implementing and maintaining a cryptographic system. A person of skill in the art of cryptographic systems will recognize numerous other novel security measures from the detailed description of the preferred embodiment of the present invention.

A further aspect of the present invention is a method of establishing a secure electronic link between a first unit and a second unit of a cryptographic system. The method begins with the steps of generating a first public key pair consisting of a first public key and a first private key; securely communicating the first private key to the first unit; and sending a first chain of authentication certificates to the second unit, where this first chain of authentication certificates authenticates the first public key. The method continues with the steps of generating a second public key pair consisting of a second public key and a second private key; securely communicating the second private key to the second unit; and sending a second chain of authentication certificates to the first unit, where this second chain of authentication certificates authenticates the second public key. Next, the method continues with the steps of authenticating the second unit in the first unit using the second chain of authentication certificates and authenticating the first unit in the second unit using the first chain of authentication certificates. Finally, the method concludes with the steps of communicating a private encryption/decryption key, encrypted in the second public key, from the first unit to the second unit and decrypting the private encryption/decryption key in the second unit.

DETAILED DESCRIPTION OF THE PREFERRED EMBODIMENT

Figure 1:
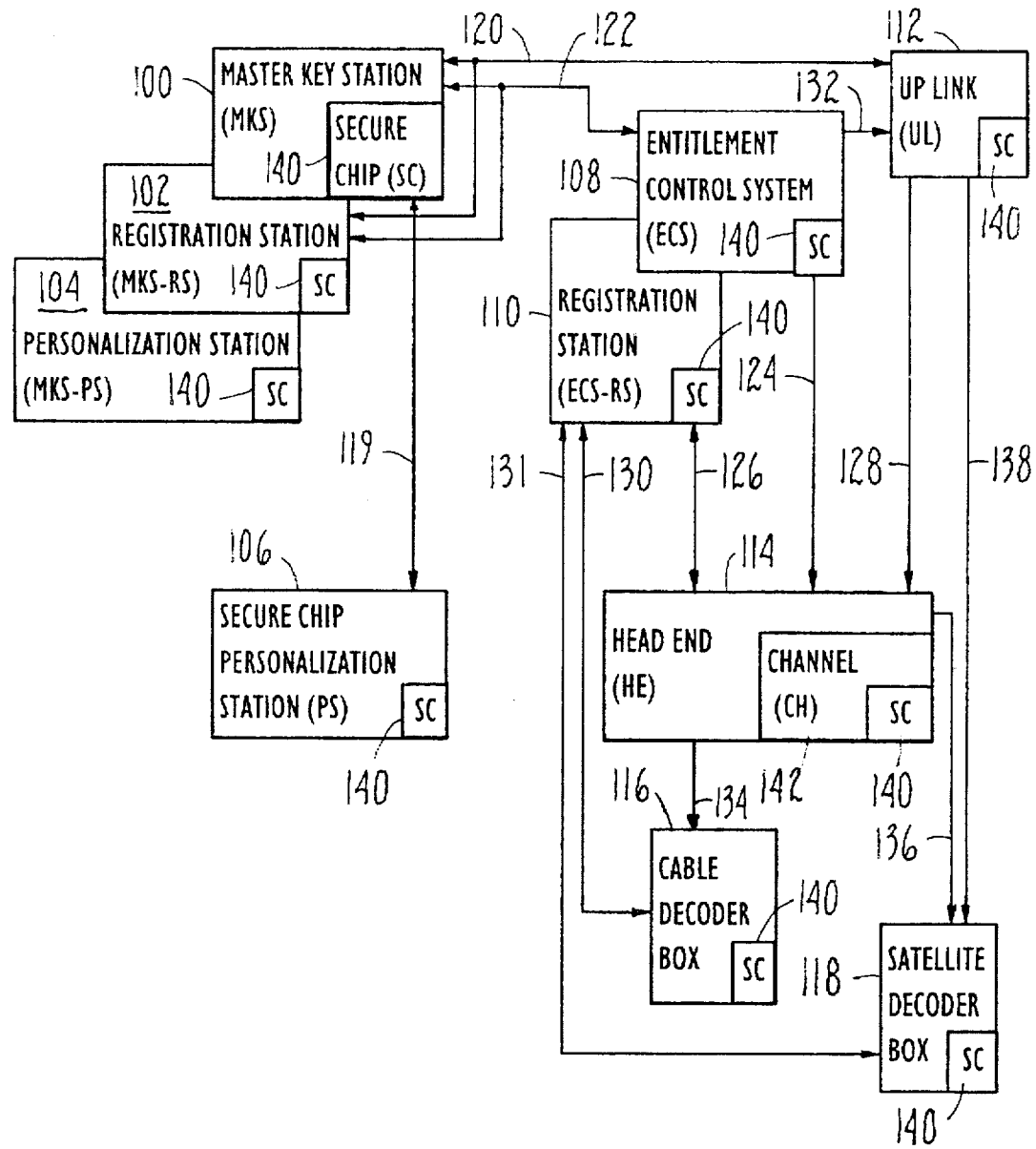
FIG. 1 illustrates a general functional block diagram of a cable and satellite television system incorporating the cryptographic method of the present invention.

FIG. 1 illustrates a cable and satellite television communication system incorporating the cryptographic system of the present invention. Although the preferred embodiment of the present invention will be described in relation to a subscriber television system, one of skill in the art will understand the present disclosure to apply to a wide variety of communication systems. For example, the present invention can be applied to a subscriber radio system or an ordinary computer network. In addition, one of skill in the art will understand the present disclosure to apply to other systems for which communication is not the primary purpose. For example, the present invention can also be applied to an alarm system to establish a secure communication link between different elements of the system. Use of the word "communication" or "communicate" in the present specification is generally intended to refer to the general concept of transferring information from a source to a destination. These terms should not be construed to limit the scope of the invention to a "communication system," where the primary objective of the system is to communicate information. The present invention can apply to systems in which the communication of information is only a minor, or even insignificant, aspect of the overall system. In fact, the present invention can be adapted for use in any system for which a secure cryptographic link is desired.

For purposes of this specification, a "communication link" will comprise some physical medium over which information can be communicated between two elements of a system and some mutually understood method or technique for communicating. The physical communication medium may comprise, for example, a hard-wired electrical connection, an ordinary telephone line, a computer network line, a fiber optic cable, or a radio broadcast communication link. The communication method or technique may comprise, for example, a specific language, a shared syntax for coded messages, or an encryption/decryption algorithm. A "communication network" will refer to a set of communication links, where each communication link may use a different physical communication medium and a different communication method or technique. A communication link or network will be "secure" if an encryption/decryption system is used for which determination of encrypted information is computationally or economically infeasible without knowledge of specific decryption information and where the decryption information has not been acquired by outsiders, or if a signature/verification system is used for which unauthorized insertion or modification of signed information is computationally or economically infeasible without knowledge of specific signature information and where the signature information has not been acquired by outsiders. Preferably, an encryption/decryption system is used for which determination of encrypted information is computationally infeasible without knowledge of specific decryption information, and a signature/verification system is used for which unauthorized insertion or modification of signed information is computationally infeasible without knowledge of specific signature information. A communication link or network will be considered "compromised" if an outsider acquires the decryption information of an encryption/decryption system or the signature information of a signature/verification system. An "outsider" or "pirate" will refer to a person or communication unit that is not an intended recipient or source of certain information.

A person of skill in the art will understand that the preferred embodiment of the present invention may comprise a pure cable television system, a pure satellite television system, or a combination cable and satellite television system. The preferred embodiment of the present invention will be described in terms of a cable and satellite subscriber television system. The preferred embodiment relates to a method and apparatus for establishing a secure communication link between the different elements of the subscriber television system for which communication is desired.

Returning to the subscriber television system of FIG. 1, the preferred embodiment comprises a number of communication elements or units, including a master key station (MKS) 100, an MKS registration station (MKS-RS) 102, an MKS personalization station (MKS-PS) 104, a secure chip personalization station (PS) 106, an entitlement control system (ECS) 108, an ECS registration station (ECS-RS) 110, an uplink (UL) 112, a head end (HE) 114, a cable decoder box (DEC) 116 and a satellite decoder box (DEC) 118. The MKS 100, the MKS-RS 102 and the MKS-PS 104 could alternatively be combined to form a single unit. Also, the ECS 108 and the ECS-RS 110 could be combined. Each of the communication elements in the system will preferably comprise a programmable computer. Each of these computers will be programmed to perform the appropriate functions of the present invention, as described below. Each of the communication elements in the system will contain one or more integrated circuit components referred to as secure chips (SC) 140. Also, the head end 114 will comprise one or more head end channels 142, each of which will contain one or more secure chips 140.

The MKS 100 is connected to the PS 106 by a communication line 119. For a subscriber television system, messages will preferably be transferred between the MKS 100 and the PS 106 by a human courier physically transporting the messages. Thus, the line 119 may comprise a courier walking between units, and need not comprise an electronic medium. The MKS 100 and the MKS-RS 102 are connected to the UL 112 by a communication line 120. The MKS 100 and the MKS-RS 102 are connected to the ECS 108 by a communication line 122. Again, the communication lines 120, 122 will preferably consist of a human courier physically carrying messages between the respective units. In some embodiments, a physically protected electronic medium may be sufficiently secure for the lines 120, 122. The ECS 108 is connected to the UL 112 by a communication line 132. The ECS 108 is connected to the head end 114 by a communication line 124. The ECS-RS 110 is connected to the head end 114 by a communication line 126. The UL 112 is connected to the head end 114 by a communication line 128. The head end 114 is connected to the cable decoder box 116 by a communication line 134. The ECS-RS 110 is connected to the cable decoder box 116 by a communication line 130. The ECS-RS 110 is connected to the satellite decoder box 118 by a communication line 131. The head end 114 is connected to the satellite decoder box 118 by a communication line 136. The UL 112 is connected to the satellite decoder box 118 by a communication line 138. In addition, local communication lines are provided between the MKS 100, the MKS-RS 102 and the MKS-PS 104, and between the ECS 108 and the ECS-RS 110, although these lines are not illustrated in FIG. 1. The MKS 100, MKS-RS 102 and MKS-PS 104 may be different functional units within the same equipment housing, or otherwise physically connected. On the other hand, if these units 100, 102, 104 are physically separated, then the local communication lines will be physically protected, such as by human courier. The communications line between the ECS 108 and the ECS-RS 110 will either be physically protected or cryptographically secured.

The subscriber television system of FIG. 1 performs two primary functions. First, the system distributes the various video signals constituting the various television channels, one or more of which may be scrambled, to the different cable decoder boxes 116 and satellite decoder boxes 118 in the system. Second, the system distributes cryptosystem keys and other information to allow specific decoder boxes 116, 118 to unscramble the appropriate video signals and receive the appropriate television programs. A typical implementation of the present invention in a subscriber television system may comprise a single master key station 100, with an associated registration station 102 and personalization station 104; between 10-20 secure chip personalization stations 106; from one to ten entitlement control systems 108, with associated registration stations 110; from one to ten uplinks 112; on the order of 10,000 or more head ends 114; and up to approximately 10,000,000 decoder boxes 116, 118. However, for convenience, the description will generally assume a system comprising one of each type of unit.

The communication lines 132, 126 and 124 may constitute ordinary computer network interfaces. There is no need to ensure that pirates do not have access to these communication lines. The present invention will provide a secure communication environment despite such pirate access. The communication line 128 provides a satellite communication interface between the uplink 112 and the head end 114. The communication line 134 is a standard cable interface between a head end 114 and a cable decoder box 116. The communication line 136 provides a satellite communication interface between the head end 114 and a satellite decoder box 118, such as in an existing "television receive only/pass through" system (TVRO/PT). The communication line 138 provides a satellite communication interface between the uplink 112 and the satellite decoder box 118, such as in an existing "television receive only" system (TVRO). The communication lines 130 and 131 are standard telephone lines.

The uplinks 112 receive video signals from a variety of sources, such as a first run movie source. The uplinks 112 distribute these video signals to the different head ends 114 in the system via the communication line 128 and to the different satellite decoder boxes 118 via the communication line 138. Each of the head ends 114 distributes these video signals to a number of the cable decoder boxes 116 via the communication line 134 and to a number of the satellite decoder boxes 118 via the communication line 136. The uplinks 112 may scramble one or more of the video signals before transmitting the signals to either the head end 114 or the satellite decoder boxes 118. If so, then the head ends 114 will typically unscramble one or more of the scrambled video signals. Before retransmitting the video signals to the decoder boxes 116 and 118, the head end 114 may also scramble one or more of the video signals. The decoder boxes 116 and 118 will then unscramble one or more of the video signals that have been scrambled by either the head end 114 or the uplink 112.

The entitlement control system 108 can control which head ends 114 and which decoder boxes 116 and 118 can unscramble each of their respective video signals by selectively providing them with appropriate decryption information. The ECS 108 also controls the scrambling of the video signals by the UL 112 and the HE 114 by providing these units with appropriate encryption information. The process of controlling access to video signals by different elements in the system will be referred to as "entitlement." The encryption/decryption information disseminated by the ECS 108 must be carefully guarded because, if a pirate obtains this information, the pirate can have unauthorized access to the video signals of the subscriber television system. In other words, the pirate could watch television programs without paying any subscriber fees. Such piracy can deprive subscriber television providers of great sums of earned income. The present invention provides a method for establishing secure communication links for the dissemination of this critical encryption/decryption information.

The master key station 100, the MKS registration station 102, the MKS personalization station 104, the secure chip personalization station 106 and the ECS registration station 110 do not have any direct control over the distribution of the video signals or the entitlement of different head ends 114 or decoder boxes 116, 118 to receive the different video signals. Instead, the main function of these units is to establish a secure communication network for the remaining units of the system, as described in greater detail below. These remaining units, the ECS 108, the UL 112, the HE 114 and the decoder boxes 116, 118, will be referred to as "operational units."

Figure 2:
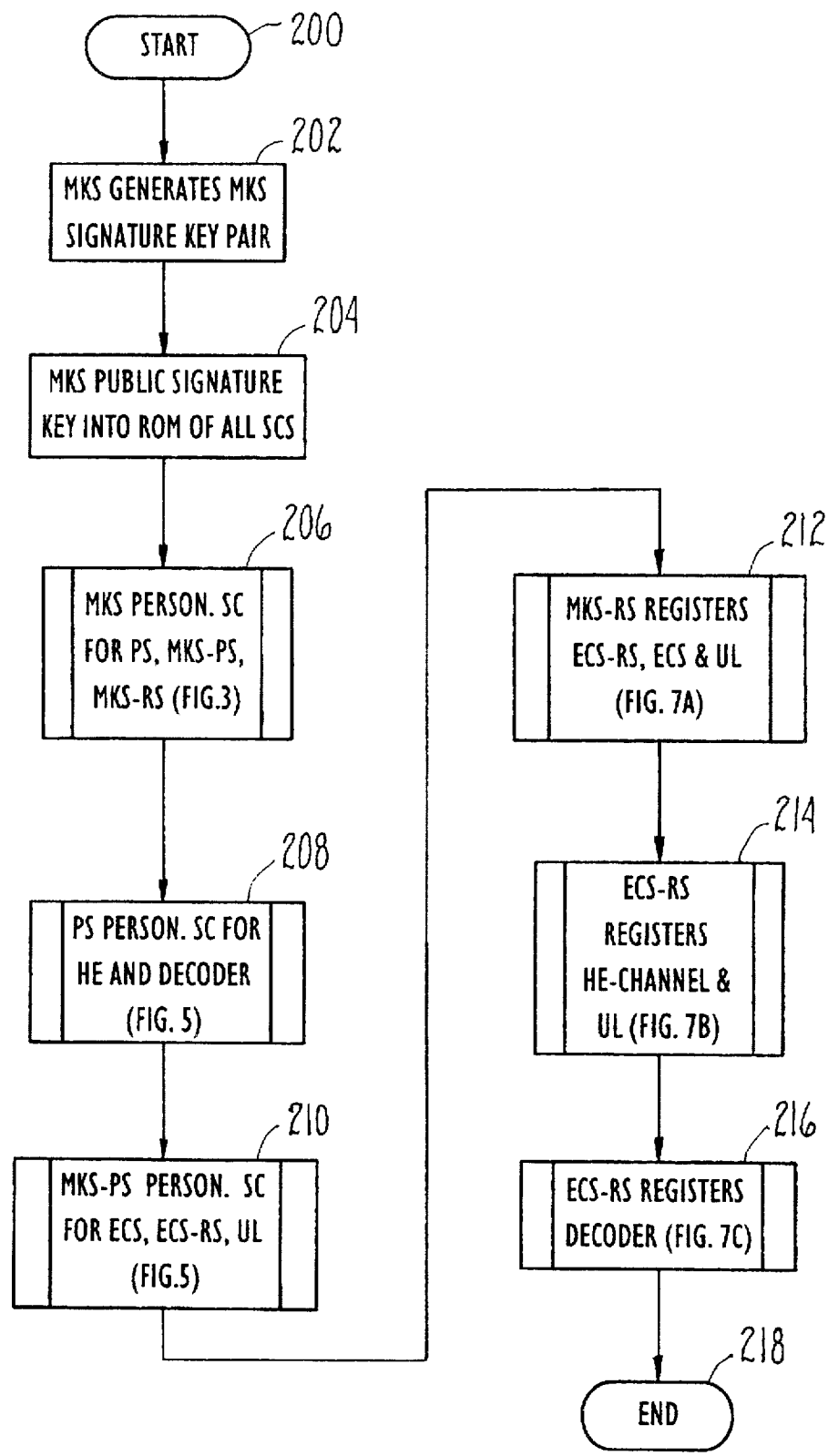
FIG. 2 illustrates a flowchart for establishing a secure communication network in the cable and satellite television system of FIG. 1.

FIG. 2 illustrates the preferred method of the present invention for establishing a secure communication environment for the operational units of the subscriber television system of FIG. 1. The method begins at a block 200. At a process block 202, the MKS generates an MKS public/private signature key pair. As described above in the description of the related art, the prior art discloses several thoroughly tested methods for generating a public/private signature key pair. A person of skill in the art will understand how to generate public/private signature key pairs by referring to appropriate prior art references, such as the DSS, which was referred to above. The DSS will be the preferred algorithm for generating public/private signature key pairs, although other algorithms can also be used.

As described above in the description of the related art, a public key cryptosystem will typically only be secure if each private key is known only by the entity to which the private key belongs. In addition, each of the public keys must be distributed in a manner that allows each element of the system to authenticate the source of a public key. The present invention implements an authentication scheme based on authentication certificates generated by a "trusted authority." The MKS 100 will function as this trusted authority. As described above, a public key cryptosystem based on authentication by a trusted authority will only be secure if each of the elements of the system obtains a true copy of the public key of the trusted authority. In the present invention, the public key of the MKS 100 is distributed to the elements of the system in a very reliable manner, as described immediately below.

In the preferred embodiment, each of the units in the subscriber television system, except possibly the MKS 100, will contain a secure circuit that performs cryptographic functions of the present invention. The secure circuit will be resistant to tampering and eavesdropping by a pirate. Preferably, the secure circuit will take the form of an integrated circuit component, referred to as a secure chip (SC) 140, as shown in FIG. 1. Each of these secure chips 140 in the different units of the system may be identical to one another, or they may contain different software routines to perform the different functions required by the different units in the system, or they may have different hardware configurations. Nevertheless, each of the secure chips 140 in the system will contain at least one common feature; namely, the public key of the MKS 100 will be programmed into read-only memory (ROM) on the secure chip 140 to provide permanent storage of this key. This step is performed at a process block 204 of FIG. 2. Thus, the mask that is used to manufacture the secure chips 140 will contain the public key of the MKS 100. Because the ROM cannot be changed after an integrated circuit component is manufactured, any secure chip 140 manufactured using a mask containing the public key of the MKS 100 will have reliable access to the public key of the MKS 100 for the life of the secure chip 140.

At this point, the system comprises an MKS 100 and a number of secure chips 140. Next, at a process block 206, the MKS 100 personalizes a secure chip 140 for the personalization station 106, the MKS personalization station 104, or the MKS registration station 102. The process block 206 will be executed once for the MKS-RS 102, once for the MKS-PS 104, and once for each personalization station 106 in the system. The personalization process achieves three main objectives. First, it provides the secure chip 140 with a public/private signature key pair, without allowing any other element to have access to the private signature key of the secure chip 140. In fact, after the personalization process is completed, even the unit performing the personalization does not have access to the private signature key of the secure chip 140. Second, the personalization process provides the secure chip 140 with a chain of authentication certificates so that the secure chip 140 can prove to other elements that it has been directly or indirectly personalized by the MKS 100. These other elements can verify the authentication of the secure chip 140 even if they only possess the public signature key of the MKS 100. The third main objective achieved by the personalization process is to ensure that the process is performed only by an authenticated and authorized source. The process for the personalization of the secure chips 140 of the PS 106, the MKS-PS 104 and the MKS-RS 102 by the MKS 100 will be described in greater detail below, with reference to FIG. 3.

After a secure chip 140 has been personalized, it can be incorporated into one of the communication units of the system. After a secure chip 140 has been incorporated into the PS 106, the MKS-RS 102 and the MKS-PS 104, then each of these units, along with the MKS 100, can begin performing its intended functions, including communicating with one another over the communication line 119 and the local MKS communication lines.

At a process block 208, the personalization station 106 personalizes the secure chips 140 for the channels 142 of the head end 114 and the decoder 116, 118. The process block 208 will be executed once for each channel of each head end 114 in the system and once for each decoder 116, 118 in the system. The process for the personalization of the secure chips 140 by the personalization station 106 is similar to the personalization of the secure chips 140 by the MKS 100, except that the personalization station 106 also provides the secure chip 140 with a public/private encryption key pair, designated the rekey key pair. After the personalization process is completed, the personalization station 106 no longer has access to either the private signature key or the private rekey key of the secure chip 140.

At a process block 210, the MKS personalization station 104 personalizes the secure chips 140 for the ECS 108, the ECS-RS 110 and the UL 112. The process block 210 will be executed once for each ECS 108, once for each ECS-RS 110 and once for each UL 112 in the system. This personalization process is very similar to the personalization of the secure chips 140 by the personalization station 106. Both of these personalization processes are described in greater detail below with reference to FIG. 5.

After every secure chip 140 has been personalized, each secure chip 140 will be incorporated into an appropriate communication unit. At this point, the MKS 100, the MKS-RS 102, the MKS-PS 104 and every PS 106 in the system will have its own public/private signature key pair. In addition, every ECS 108, every ECS-RS 110, every UL 112, every channel 142 of every HE 114, and every decoder box 116, 118 will have its own public/private signature key pair and public/private rekey key pair. In addition, every communication element, except the MKS 100, has a chain or hierarchy of authentication certificates linking it back to the MKS 100.

For example, a cable decoder box 116 will have a hierarchy of authentication certificates consisting of two levels. The first or highest level certificate will be a PS authentication certificate created by the MKS 100 for the PS 106 that personalized the cable decoder box 116. The creator of an authentication certificate will be referred to as the "authority" of the certificate, while the secure chip 140 being authenticated will be referred to as the "subject" of the certificate. Also, the unit containing the secure chip 140 may also be referred to as the subject. This certificate will indicate that the MKS 100 has recognized the public key of the PS 106, and that the MKS 100 has authorized the PS 106 to personalize other secure chips 140. The last or lowest level certificate will be a SC authentication certificate for the cable decoder box 116. This certificate will indicate that the PS 106 recognized the public signature key of the cable decoder box 116, and that the cable decoder box 116 is authorized to operate as a cable decoder box 116. Thus, the PS 106 is the authority with respect to this second certificate, while the cable decoder box 116 is the subject. The combination of these two authentication certificates provides indirect authentication of the cable decoder box 116 by the MKS 100.

After a secure chip 140 has been incorporated into the ECS 108 and the ECS-RS 110, then these two units can begin to communicate with one another over the local ECS communication line. However, all remaining communication links will remain inoperable until appropriate units are registered. First, at a process block 212, the MKS-RS 102 registers the ECS-RS 110, the ECS 108 and the UL 112. The process block 212 will be executed at least once for each of these units in the system. This registration is performed on behalf of the MKS 100.

The registration process comprises three main functions. First, the unit performing the registration authenticates the unit to be registered by checking its chain of authentication certificates linking it to the MKS 100. Second, the unit to be registered authenticates the unit performing the registration by checking its chain of authentication certificates linking it to the MKS 100. Third, the unit performing the registration generates a random private encryption key and privately sends it to the unit to be registered and to the unit for which the registration is being performed. The unit performing the registration then destroys all copies of the private key that it has retained, so that the other two units can establish a secure communication link using the private key. The format of this private encryption key, and the algorithm used to generate the key will depend on the particular implementation of the entire system. For example, for a system utilizing the descrambler system disclosed in U.S. Pat. No. 4,634,808, issued to Moerder, the private encryption key will comprise the unit seeds described in that patent. The registration of the ECS-RS 110, the ECS 108 and the UL 112 by the MKS-RS 102 will be described in greater detail below with reference to FIG. 7A.

The registration process also serves to identify the newly registered unit to the MKS 100 so that the MKS 100 can begin transmitting appropriate messages and information. This identification upon registration allows a system to be implemented without predefining the number and location of each type of unit in the system. This adds great flexibility to the implementation of a system of the present invention. In addition, this aspect allows the configuration of the system to be expanded or modified while the system is operating. The same rationale applies to registration of HE channels 142 and decoder boxes 116, 118. At this point in the present invention, the ECS 108, for example, is unaware of any HE channels 142 or decoder boxes 116, 118, and has no knowledge as to the ultimate number or configuration of these units. As each HE channel 142 and each decoder box 116, 118 is registered, then the ECS 108 begins transmitting appropriate messages and information to the newly registered units.

At a process block 214, the ECS-RS 110 registers the UL 112 and a channel 142 of the head end 114. The process block 214 will be executed one time for each UL 112 in the system and for each channel 142 in each head end 114 of the system. In this registration process, the ECS-RS 110 will generate and send a private encryption key to the unit to be registered. This registration process will be described in greater detail below with reference to FIG. 7B.

At a process block 216, the ECS-RS 110 registers a decoder box 116, 118. The process block 216 will be executed once for each cable decoder box 116 and satellite decoder box 118 in the system. The ECS-RS 110 will again generate and send a private encryption key to the unit to be registered. This registration process will be described in greater detail below with reference to FIG. 7C.

At a block 218, the method of the present invention is complete, and a secure communication network has been established between the different operational units of the subscriber television system. More specifically, the ECS 108 now has a unique private encryption key and a unique public signature verification key for each of the uplinks 112, each of the channels 142 of each of the head ends 114, and each of the decoder boxes 116, 118, as well as a single private signature key for use with all of these units. The ECS 108 can now send encryption/decryption information to the appropriate operational units by encrypting the information in each of the operational units' respective private encryption keys. In addition, the ECS 108 can sign the information using its private signature key, as required, so that each of the operational units can verify the source of the information by applying the corresponding public signature verification key. Finally, where appropriate, the ECS 108 can verify the source of a signed message by applying the public signature verification key that corresponds to a private signature key of the unit that appears to have sent the message. A would-be pirate will now have a very difficult time breaking the encryption network to obtain the information necessary to unscramble the video signals.

Even if a pirate manages to break the secure environment, for example, by obtaining one of the private encryption keys, a secure communication network can generally be re-established by re-registering some or all of the operational units of the system. The re-registration of the operational units can be performed in the same manner as described and illustrated with reference to FIGS. 7A, 7B and 7C. Thus, the re-registration of the operational units can be performed remotely.

This re-registration process is a major advantage of the present invention over the subscriber television systems of the prior art. Typically, when a subscriber television system has been compromised, a large number of decoder boxes must be replaced, costing the service provider large sums of money. Alternatively, the decoder boxes may contain a replaceable security cartridge that can be replaced in a number of the decoder boxes to re-establish a secure communication network. The process of remotely re-registering the operational units upon a compromise of the secure network greatly simplifies the process and reduces the cost of re-establishing a secure network. In the subscriber television system incorporating the present invention, there is no need to modify the hardware of the system, or even to move any of the hardware units of the system, to re-establish the secure network. The number of units that must be re-registered to re-establish a secure network will depend on the particular compromise that is involved and must be determined on a case-by-case basis. For example, if a private encryption key of a particular cable decoder box 116 is obtained by a pirate, then only that particular cable decoder box 116 must be re-registered. The ECS 108 can transmit a message to the cable decoder box 116 to indicate that the cable decoder box 116 must be re-registered. At that point, the re-registration process of the cable decoder box 116 will proceed as described below with reference to FIG. 7C. A re-registration process may also be performed to compensate for some forms of cryptographic weakness in other areas of the secure communications system in which the present invention is incorporated. For example, in a subscriber television system, if a video stream cipher technique is utilized that is vulnerable to pirate attacks, then re-registration, followed by dissemination of new cipher keys, can be used to ensure a secure communication network.

Also, if a private signature key or a private encryption key of a secure chip 140 is compromised, then that particular secure chip 140 can be replaced by a new secure chip 140. The new secure chip 140 should be personalized according to a personalization process, as described below with reference to either FIG. 3 or FIG. 5. Then the new secure chip 140 can be incorporated into the same element from which the old secure chip 140 was removed. The element receiving the new secure chip 140 must then be registered according to one of the processes described below with reference to FIGS. 7A, 7B and 7C. Depending on the element that has been compromised, other elements in the system may also need to be re-registered. For example, if the ECS 108 has been compromised, then each of the other operational units associated with that ECS 108 should also typically be re-registered because all of the private encryption and signature keys associated with that particular ECS 108 will typically not be trusted.

In the preferred embodiment of the present invention, the re-registration process described above will also be periodically executed for each of the operational units in the system to further safeguard the security of the communication network.

Figure 3:
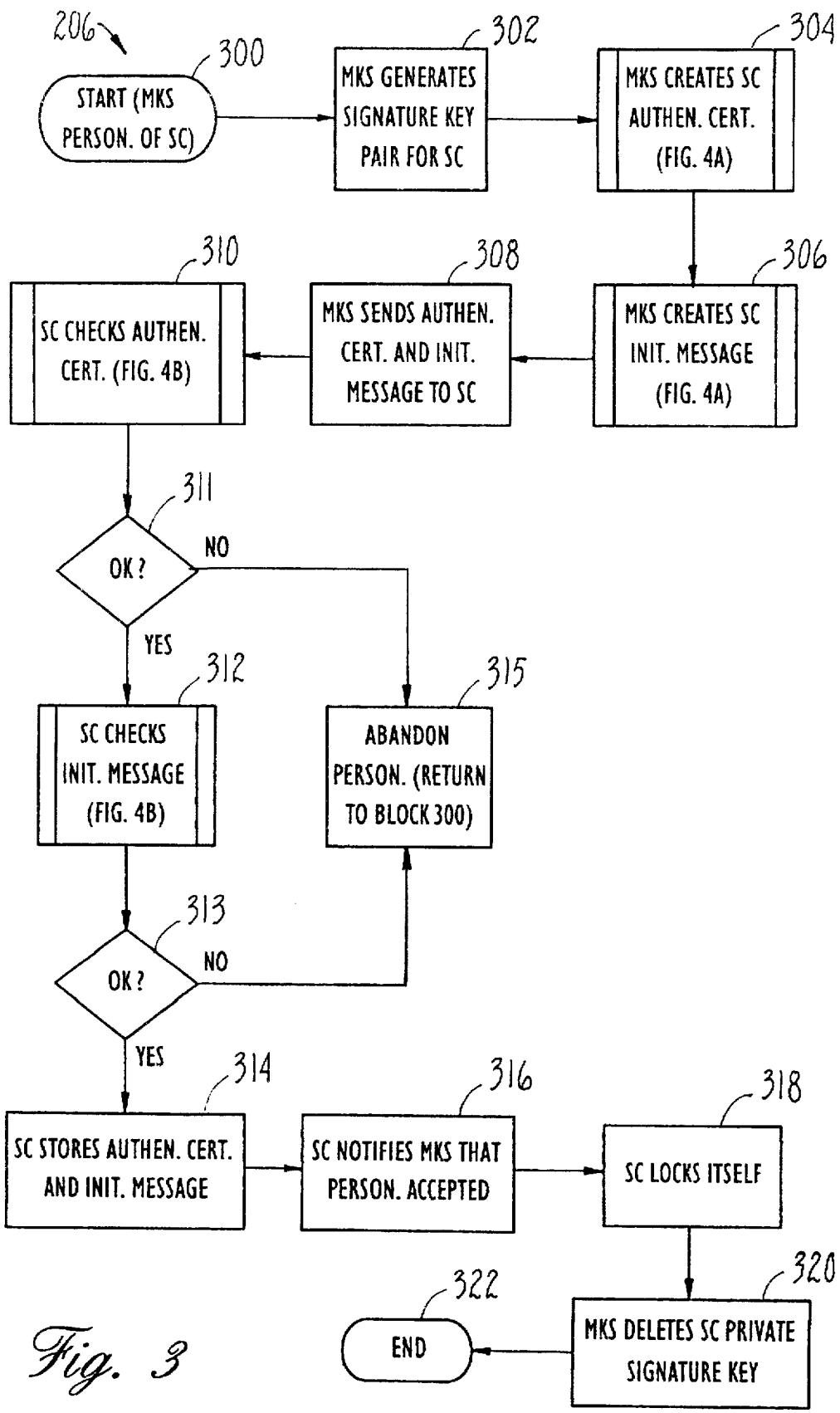
FIG. 3 illustrates a flowchart for the personalization by an MKS of a secure chip of an MKS-PS, an MKS-RS or a PS of the system of FIG. 1.

FIG. 3 illustrates the process for an MKS 100 to personalize a secure chip 140 of a PS 106, an MKS-PS 104 or an MKS-RS 102, as represented by the process block 206 in FIG. 2. At a block 300 of FIG. 3, the personalization of a secure chip 140 begins. At a process block 302, the MKS 100 generates a public/private signature key pair for the secure chip 140 that will be personalized. This step is the same as the process described above with reference to the process block 202 of FIG. 2.

At a process block 304, the MKS 100 creates an authentication certificate for the secure chip 140. The purpose of the authentication certificate is to indicate that the MKS 100 recognizes the public signature key of the secure chip 140 and to indicate that the unit containing the secure chip 140 is authorized to perform the functions specified in the certificate. For example, a secure chip 140 for a PS 106 will be authorized to personalize other secure chips 140. The process for creating an authentication certificate for the secure chip 140 will be described in greater detail below with reference to FIG. 4A. Appendix A1 contains a table indicating the general formats of the authentication certificate for a PS 106, an MKS-PS 104 or an MKS-RS 102 of the preferred embodiment. Appendices A2–A7 contain tables indicating the general formats of other certificates and messages of the preferred embodiment. The format of each of the certificates and messages represented by Appendices A1–A7 can vary widely in different implementations of the present invention. For the preferred embodiment, each of these certificates and messages will comprise a number of field types and sub-field types. The authentication certificate of Appendix A1 further comprises a certificate header, an authorization block, a public signature key and a signature block. The certificate header further comprises a certificate ID, an issuer ID, an issuer certificate ID, an effective date and an expiration date. Appendix A8 contains a list of definitions of the field types of Appendices A1–A7.

At a process block 306, the MKS 100 creates an initialization message for the secure chip 140, which will contain the private signature key for the secure chip 140. The process of creating this message will be described in greater detail below with reference to FIG. 4A. Appendix A2 contains a table indicating the general format of the initialization message for a PS 106, an MKS-PS 104 or an MKS-RS 102 of the preferred embodiment.

At a process block 308, the MKS 100 sends the authentication certificate created in the process block 304 and the initialization message created in the process block 306 to the secure chip 140. This transfer must be done in a secure environment because the initialization message contains the private signature key for the secure chip 140. If an outsider intercepts this message, then the outsider may be able to impersonate the secure chip 140 by signing messages with the private signature key of the secure chip 140. Preferably, the MKS 100 will be in a very secure environment. For example, depending on the threat of piracy, the MKS 100 may be contained in a high security vault, with armed guards. Preferably, the secure chip 140 will be taken into direct contact with the MKS 100, within the secure environment, for the personalization process. One of skill in the art will know of numerous methods for ensuring the secure communication of these messages.

At a process block 310, the secure chip 140 checks the authentication certificate obtained from the MKS 100 by applying the MKS public signature key obtained from the ROM of the secure chip 140. The process for checking the authentication certificate will be described in greater detail below with reference to FIG. 4B.

At a decision block 311, the secure chip 140 determines whether the check of the authentication certificate performed at the process block 310 was successful, or whether it returned with an error condition. If the check of the authentication certificate was not successful, then the secure chip 140 will advance to a process block 315. At this point, the secure chip 140 will abandon the personalization process and return to the block 300 to restart the personalization process. If the check of the authentication certificate was successful, then the secure chip 140 will advance to a process block 312.

At the process block 312, the secure chip 140 checks the initialization message received from the MKS 100. Again, the secure chip 140 will apply the public signature key of the MKS 100, obtained from the ROM of the secure chip 140. The process for checking the initialization message will also be described in greater detail below with reference to FIG. 4B.

At a decision block 313, the secure chip 140 determines whether the check of the initialization message performed at the process block 312 was successful, or whether it returned with an error condition. If the check of the initialization message was not successful, then the secure chip 140 will advance to the process block 315 and abandon the personalization process. If the check of the initialization message was successful, then the secure chip 140 will advance to a process block 314.

At the process block 314, the secure chip 140 stores the authentication certificate and the initialization message obtained from the MKS 100. The secure chip 140 will carefully guard the contents of the initialization message, because it is essential that no outsider obtain the private signature key contained in that message.

At a process block 316, the secure chip 140 notifies the MKS 100 that the authentication certificate and the initialization message have been accepted by the secure chip 140, and that the personalization of the secure chip 140 has been completed. At a process block 318, the secure chip 140 will perform a lock routine so that the secure chip 140 will not accept any further attempts at personalization. This lock routine will ensure that the secure chip 140 never runs the personalization routine again, and ensures that the memory locations containing the authentication certificate and the initialization message can never again be modified. This lock routine will prevent would-be pirates from tampering with the stored messages, and, especially, the private signature key of the secure chip 140.

At a process block 320, the MKS 100 deletes any copy of the private signature key of the secure chip 140 that it may have retained after transmitting the initialization message to the secure chip 140. At this point, the secure chip 140 will be the only element with knowledge of its private signature key. At a block 322, the personalization of the secure chip 140 is complete.

Figure 4A:
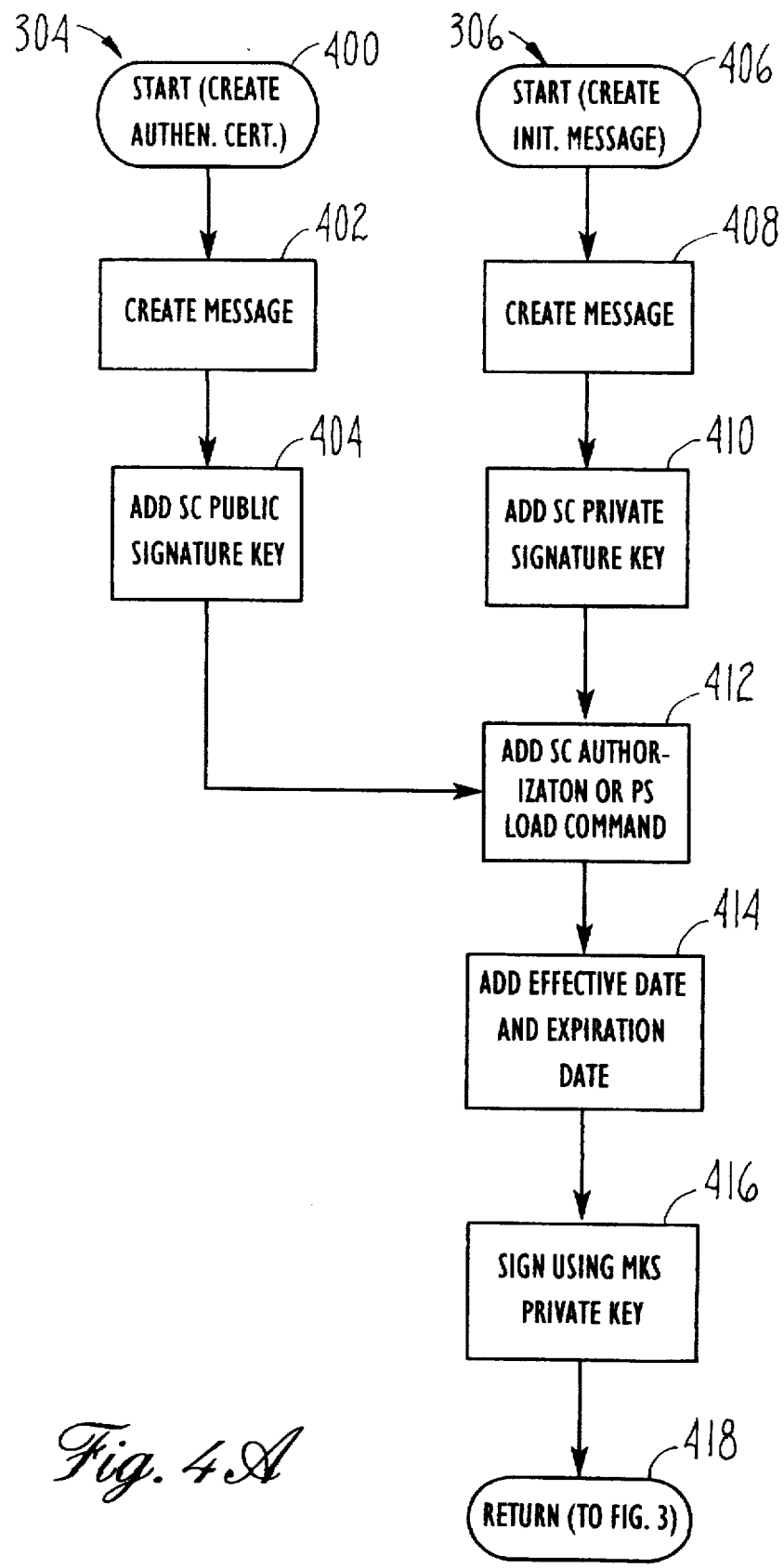
FIG. 4A illustrates a flowchart for the creation of an authentication certificate and an initialization message by an MKS for a secure chip of an MKS-PS, an MKS-RS or a PS.

FIG. 4A illustrates the process for creating an authentication certificate and the process for creating an initialization message for a secure chip 140 of a PS 106, an MKS-PS 104 or an MKS-RS 102. These processes are represented by the process blocks 304 and 306, respectively, in FIG. 3. At a block 400, the MKS 100 will begin to create the authentication certificate for the secure chip 140. At a process block 402, the MKS 100 will create the structure of the authentication certificate. At a process block 404, the MKS 100 will add the secure chip 140 public signature key that was generated in the process block 302 of FIG. 3. At a process block 412, the MKS 100 will add a data value to the message to indicate the authority that will be granted to the secure chip 140. A secure chip 140 for a PS 106 or an MKS-PS 104 will be granted the authority to personalize other secure chips 140. A secure chip 140 for the MKS-RS 102 will be granted the authority to register an ECS-RS 110, an ECS 108 and a UL 112.

At a process block 414, the MKS 100 will add a first date to the message to indicate the date on which the authentication certificate will become effective and a second date to indicate the date on which the authentication certificate will expire. As described in greater detail below, these dates specify a window in which the units receiving the secure chips 140 will be authorized to perform their functions. This is yet another safeguard to defeat pirates. For example, even if a pirate manages to obtain a PS 106, and can also obtain some secure chips 140, the pirate will only be able to personalize those secure chips 140 that have a manufacturing date code that falls between the effective date and the expiration date of the authentication certificate of the PS 106.

At a process block 416, the MKS 100 will sign the message using its private signature key and the DSS. After the MKS has signed the message, the message becomes the authentication certificate for the secure chip 140. At a block 418, the creation of the authentication certificate is complete.

At a block 406, the MKS 100 will begin the creation of the initialization message for the secure chip 140. At a process block 408, the MKS 100 will create the structure for the initialization message. At a process block 410, the MKS 100 will add the secure chip private signature key that was generated at the process block 302 of FIG. 3.

At the process block 412, the MKS 100 will add a PS load command into the message. At the process block 414, the MKS 100 will add an effective date and an expiration date for the initialization message. At the process block 416, the MKS 100 will sign the initialization message using its own private signature key and the DSS. At the process block 418, the creation of the initialization message is complete.

Figure 4B:
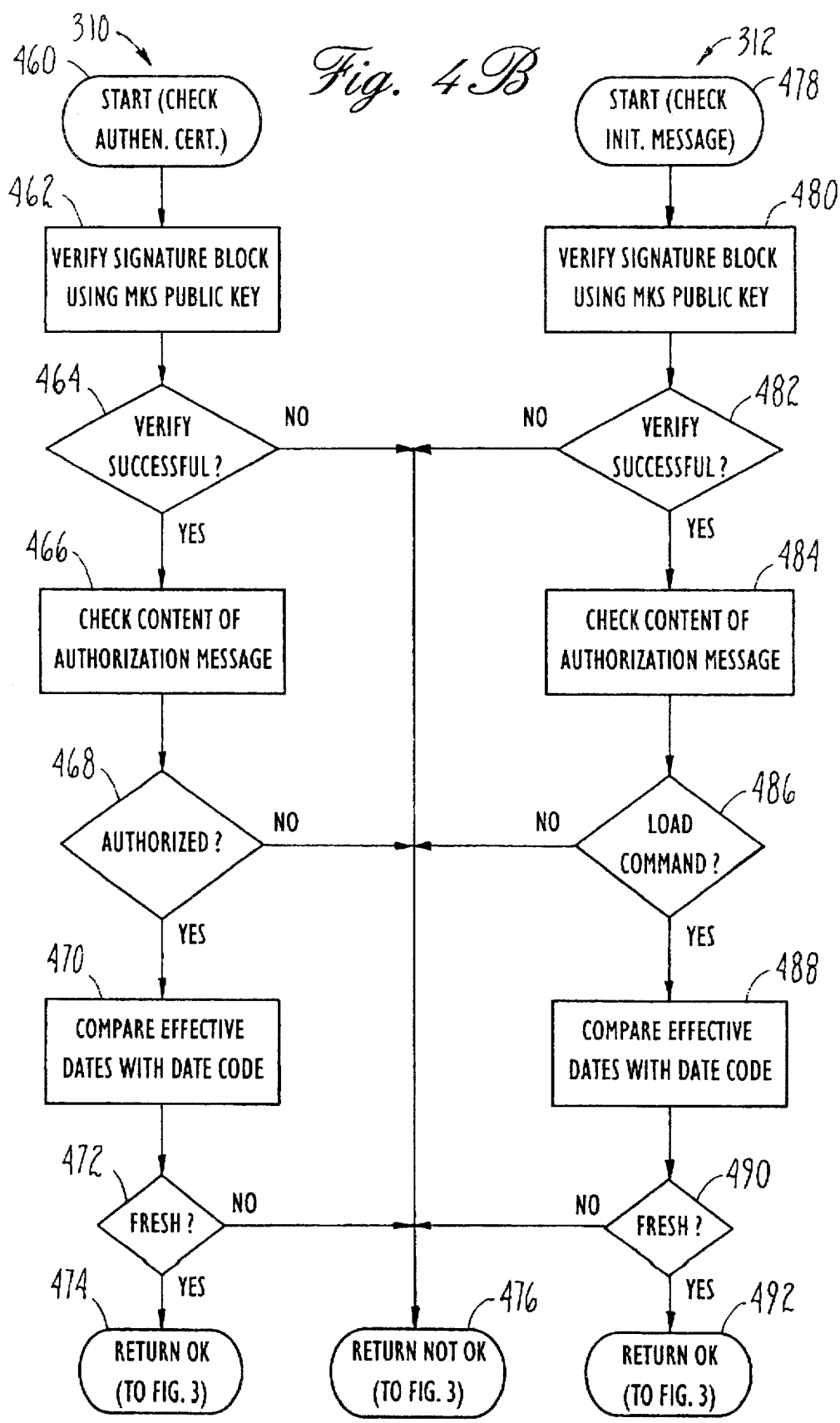
FIG. 4B illustrates a flowchart for the authentication and verification by a secure chip of the authentication certificate and the initialization message created by the processes of FIG. 4A.

FIG. 4B illustrates the process for the secure chip 140 to check the authentication certificate obtained from the MKS 100, as represented by the process block 310 in FIG. 3, and the process for the secure chip 140 to check the initialization message obtained from the MKS 100, as represented in the process block 312 of FIG. 3.

At a block 460, the process for checking the authentication certificate begins. At a process block 462, the secure chip 140 performs the signature verification algorithm of the DSS on the signature block of the authentication certificate using the public signature key of the MKS 100 to determine whether the authentication certificate was signed by the MKS 100. At a decision block 464, the secure chip 140 determines whether the signature verification was successful. If the verification was successful, then the secure chip 140 will advance to a process block 466. If the verification was unsuccessful, then the secure chip 140 will advance to a block 476. At the block 476, the secure chip 140 will return from the process of FIG. 4B with an error condition, because the element attempting to personalize the secure chip 140 is not the MKS 100. From the block 476, the secure chip 140 will return to the process of FIG. 3.

If the signature verification is successful, and the secure chip 140 advances to the process block 466, the secure chip 140 will then check the content of the authorization data value contained in the authentication certificate. This data value will indicate whether the MKS 100 has authorized the secure chip 140 to perform its designated function of either personalizing other secure chips 140 or registering other elements of the communication system. At a process block 468, if the secure chip 140 determines that it is not authorized to perform its designated function, then the secure chip 140 will advance to the block 476. At this point, the secure chip 140 will return from the process of FIG. 4B with an error condition, because of the failure of the MKS 100 to authorize the secure chip 140 to perform its function. Again, the secure chip 140 will return to the process of FIG. 3.

If the secure chip 140 determines that the MKS 100 has authorized the secure chip 140 to perform its function, then the secure chip 140 will advance to a process block 470. At the process block 470, the secure chip 140 will compare the effective date and the expiration date obtained from the authentication certificate against the manufacturing date code contained in the ROM of the secure chip 140. At a decision block 472, the secure chip 140 determines whether the authentication certificate is fresh. A certificate or message is fresh if its manufacturing date code falls between the effective date and the expiration date of the certificate or the message.

If the secure chip 140 determines that the authentication certificate is not fresh, then the secure chip 140 will advance to the block 476. At this point, the secure chip 140 will return from the process of FIG. 4B with an error condition, because the authentication certificate is invalid. The effective period of the certificate should at least cover the date code of the secure chip 140. Again, the secure chip 140 will return to the process of FIG. 3. If the secure chip 140 determines that the authentication certificate is fresh, then the secure chip 140 will advance to a block 474. At this point, the process of checking the authentication certificate has been completed, and the authentication certificate has passed the test. The secure chip 140 will return to the process of FIG. 3 with no error condition.

At a block 478, the process for checking the initialization message begins. This process is generally similar to the process for checking the authentication process, except as indicated below. At a process block 480, the secure chip 140 verifies that the initialization message was signed by the MKS 100 by applying the MKS public signature key, contained in the ROM of the secure chip 140, and the DSS. At a decision block 482, the secure chip 140 determines whether the verification was successful. If the verification was not successful, then the secure chip 140 will advance to the block 476 and return to the process of FIG. 3 with an error condition. If the secure chip 140 determines that the verification was successful, then the secure chip 140 will advance to a process block 484.

At the process block 484, the secure chip 140 will check the content of the authorization data value in the initialization message. At a decision block 486, the secure chip 140 will determine whether the authorization data value contains a load command. If there is no load command, then the secure chip 140 will advance to the block 476 and return to the process of FIG. 3 with an error condition. If there is a load command, then the secure chip 140 will advance to a process block 488.

At the process block 488, the secure chip 140 will compare the effective date and the expiration date stored in the initialization message against the manufacturing date code of the secure chip 140. At a decision block 490, the secure chip 140 will determine whether the initialization message is fresh. If the message is not fresh, then the secure chip 140 will advance to the block 476 and return to the process of FIG. 3 with an error condition. If the secure chip 140 determines that the message is fresh, then the secure chip 140 will advance to the block 492. At this point, the secure chip 140 will return to FIG. 3, and the process of checking the initialization message will have been have successfully completed.

Figure 5:
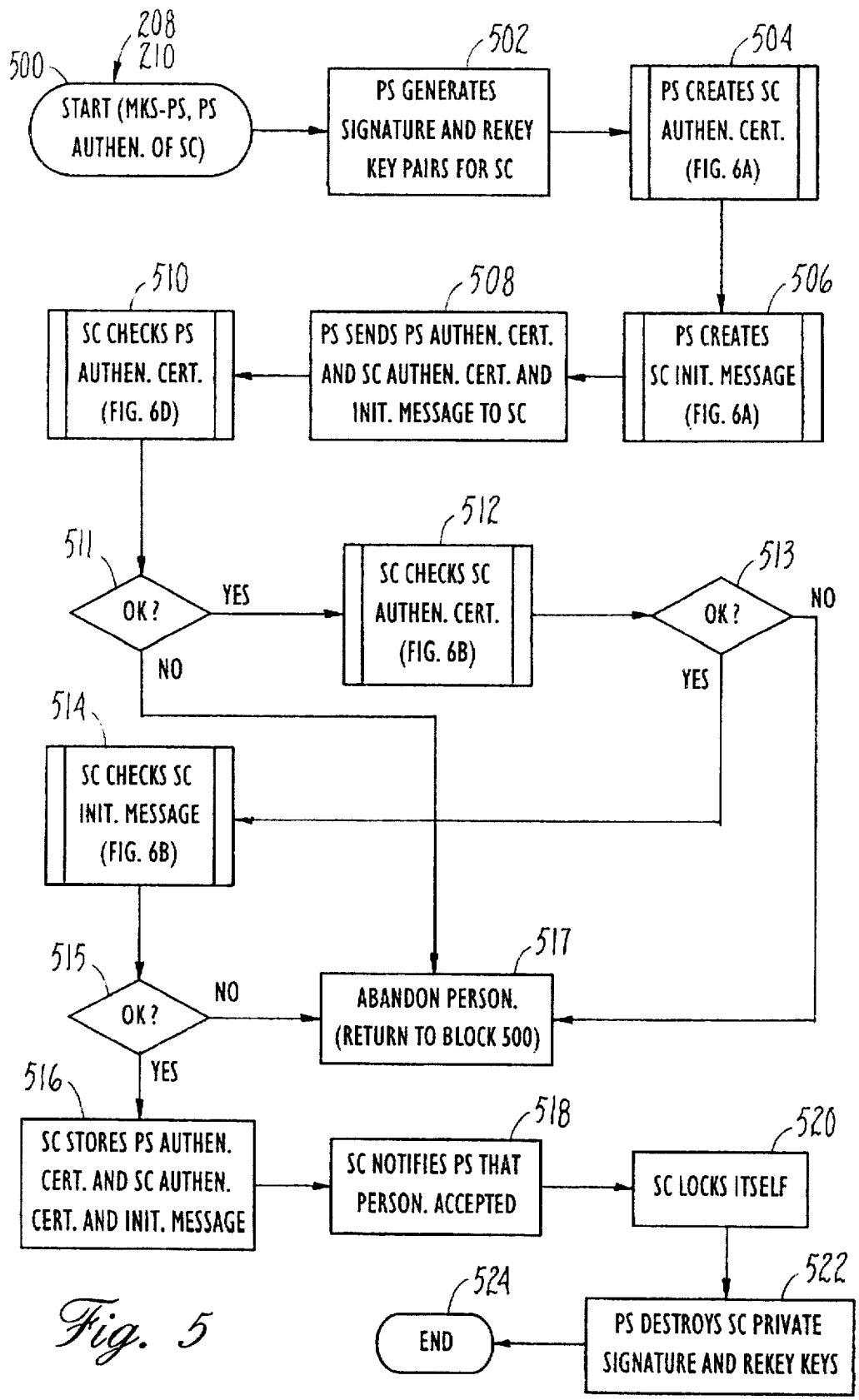
FIG. 5 illustrates a flowchart for the personalization by a PS or an MKS-PS of a secure chip of a HE, a DEC, an ECS, an ECS-RS or a UL of the system of FIG. 1.

FIG. 5 illustrates the process of personalizing a secure chip for a channel 140 of an HE 114 or for a decoder 116, 118 by a PS 106, as represented by the process block 208 of FIG. 2, and the process of personalizing a secure chip 140 for an ECS 108, an ECS-RS 110 or a UL 112 by the MKS-PS 104, as represented by the process block 210 of FIG. 2. These processes are generally similar to the process of personalizing a secure chip 140 by the MKS 100, as described above with reference to FIG. 3, except as indicated below. Both of these processes begin at a block 500. As a matter of convenience, both the PS 106 and the MKS-PS 104 will be referred to as a "personalizing unit"0 for the description of the present personalization process. At a process block 502, the personalizing unit will generate a public/private signature key pair for the secure chip 140. The personalizing unit will also generate a public/private encryption key pair, designated the rekey key pair. The rekey key pair may be generated under any reliable public key encryption method. For example, the preferred embodiment will utilize the RSA encryption method.

At a process block 504, the personalizing unit will create an authentication certificate for the secure chip 140. This secure chip authentication certificate will be similar in structure and content to the secure chip authentication certificate created by the MKS 100 in the process block 304 of FIG. 3. However, the present secure chip authentication certificate will also contain the public rekey key of the secure chip 140. The process for creating the authentication certificate will be described in greater detail below with reference to FIG. 6A. Appendix A3 contains a table indicating the general format of the authentication certificate for an HE 114, a decoder 116, 118, an ECS-RS 110 or a UL 112 of the preferred embodiment.

At a process block 506, the personalizing unit creates a secure chip initialization message. Again, the present secure chip initialization message is similar in structure and content to the secure chip initialization message created by the MKS 100 in the process block 306 of FIG. 3. However, again, the present secure chip initialization message will also contain the private rekey key for the secure chip 140. The process for creating the initialization message will be described in greater detail below with reference to FIG. 6A. Appendix A4 contains a table indicating the general format of the initialization message for an HE 114, a decoder 116, 118, an ECS-RS 110 or a UL 112 of the preferred embodiment.

At a process block 508, the personalizing unit sends the authentication certificate of the personalizing unit, as well as the authentication certificate and the initialization message of the secure chip 140, to the secure chip 140. The authentication certificate of the personalizing unit was provided from the MKS 100 to the personalizing unit during the personalization of the personalizing unit in the process block 206 of FIG. 2. The authentication certificate and the initialization message of the secure chip 140 were created in the process blocks 504 and 506, respectively. The transfer of the initialization message from the personalizing unit to the secure chip 140 must be done in a completely secure environment. Again, if an outsider obtains this message, then the outsider can impersonate the secure chip 140 to eavesdrop on communications that are intended to be private and to sign messages pretending to be the secure chip 140.

At a process block 510, the secure chip 140 checks the authentication certificate of the personalizing unit, obtained in the process block 508. This process generally comprises two steps. First, the secure chip 140 will apply the MKS public signature key to the authentication certificate to ensure that the certificate was generated by the MKS 100. Second, the secure chip 140 will verify that the personalizing unit was authorized by the MKS 100 to personalize additional secure chips 140. The process of checking the authentication certificate of the personalizing unit will be described in greater detail below with reference to FIG. 6B.

At a decision block 511, the secure chip 140 determines whether the process of checking the authentication certificate of the personalizing unit performed at the process block 510 was successful, or whether it returned with an error condition. If the process returned with an error condition, then the secure chip 140 will advance to a process block 517 and abandon the personalization process. At the process block 517, the secure chip 140 will return to the block 500 to restart the personalization process. If the process of checking the authentication certificate of the personalizing unit was successful, then the secure chip 140 will advance to a process block 512.

At the process block 512, the secure chip 140 checks the authentication certificate of the secure chip 140, also obtained in the process block 508. Here, the secure chip 140 will apply the public signature key of the personalizing unit to verify that the secure chip authentication certificate was signed by the personalizing unit. The secure chip 140 obtains the public signature key of the personalizing unit from the authentication certificate of the personalizing unit. The process of checking the secure chip authentication certificate will be described in greater detail below with reference to FIG. 6B.

At a decision block 513, the secure chip 140 determines whether the process of checking the secure chip authentication certificate performed in the process block 512 was successful, or whether it returned with an error condition. If the process returned with an error condition, then the secure chip 140 will advance to the process block 517 and abandon the personalization process. If the process of checking the secure chip authentication certificate was successful, then the secure chip 140 will advance to a process block 514.

At the process block 514, the secure chip 140 checks the initialization message of the secure chip 140, also obtained in the process block 508. Again, the secure chip 140 will verify that the initialization message was signed by the personalizing unit. The process of checking the initialization message will be described in greater detail below with reference to FIG. 6B. The secure chip 140 will ensure that the private signature and re-key keys in the initialization message are kept private.

At a decision block 515, the secure chip 140 will determine whether the process of checking the initialization message performed at the process block 514 was successful, or whether it returned with an error condition. If the process returned with an error condition, then the secure chip 140 will advance to the process block 517 and abandon the personalization. If the process of checking the initialization message was successful, then the secure chip 140 will advance to a process block 516.

At the process block 516, the secure chip 140 stores the authentication certificate of the personalizing unit, as well as the authentication certificate and initialization message of the secure chip 140. At a process block 518, the secure chip 140 notifies the personalizing unit that the authentication certificates and the initialization message have been received and verified, and that the personalization of the secure chip 140 has been completed.

At a process block 520, the secure chip 140 runs a lock routine that is similar to the lock routine that is described above with reference to the process block 318 of FIG. 3. This lock routine prevents outsiders from attempting to re-personalize a secure chip 140 or modify the contents of the memory that contains the authentication certificates and the initialization message. At a process block 522, the personalizing unit destroys any copy of the secure chip private signature and re-key keys that the personalizing unit has retained. At this point, only the secure chip 140 will have knowledge of the private signature and re-key keys of the secure chip 140. At a block 524, the personalization of the secure chip 140 is complete.

Figure 6A:
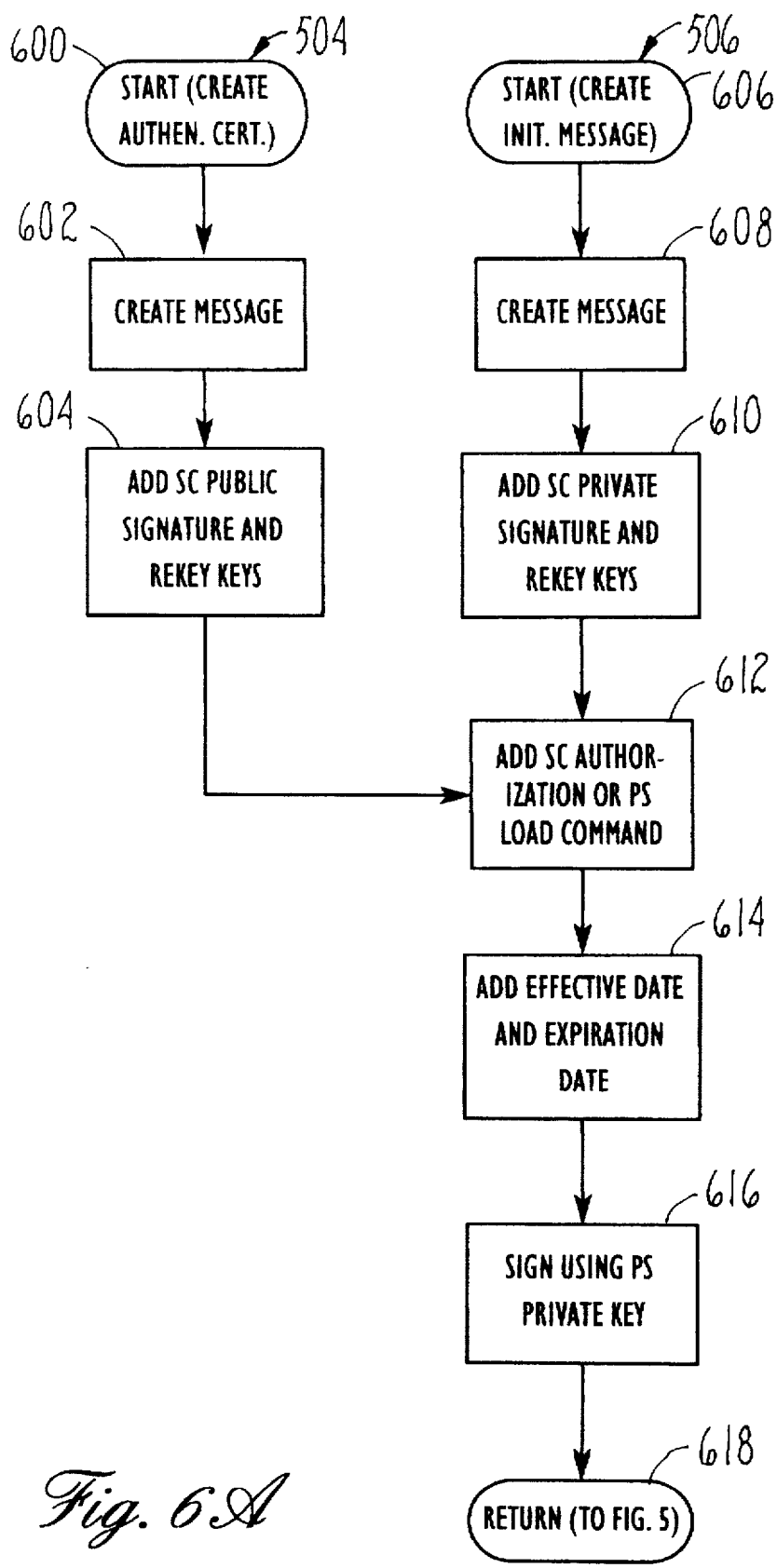
FIG. 6A illustrates a flowchart for the creation of an authentication certificate and an initialization message for a secure chip of a HE, a DEC, an ECS, an ECS-RS or a UL.

FIG. 6A illustrates the process for creating a secure chip authentication certificate, as represented by the process block 504 in FIG. 5, and the process for creating a secure chip initialization message, as represented by the process block 506 in FIG. 5. These processes are generally similar to the processes described above with reference to FIG. 4A, except as indicated. The process for creating the authentication certificate begins at a block 600. At a process block 602, the personalizing unit creates the structure for the certificate.

Referring again to FIG. 6A, at a process block 604, the personalizing unit adds the secure chip public signature and re-key keys that were generated in the process block 502 of FIG. 5 to the certificate. At a process block 612, the personalizing unit adds an authorization data value to the certificate to indicate the function that the secure chip 140 is authorized to perform. The possible functions include the functions of a channel 142 of a head end 114, a cable decoder box 116, a satellite decoder box 118, an ECS 108, an ECS-RS 110 or a UL 112.

At a process block 614, the personalizing unit will add a first date to the certificate to indicate the date on which the certificate will become effective and a second date to indicate the date on which the certificate will expire. At a process block 616, the personalizing unit will sign the certificate using the personalizing unit's private signature key and the DSS algorithm. At this point, the certificate will become the authentication certificate of the secure chip 140. After signing the certificate, the personalizing unit will advance to a block 618 to complete the process and return to FIG. 5.

The process for creating an initialization message begins at a block 606. At a process block 608, the personalizing unit creates the structure for the message.

Returning to FIG. 6A, at a process block 610, the personalizing unit will add the private signature and re-key keys of the secure chip 140 to the message. The private signature and re-key keys were generated in the process block 502 of FIG. 5.

At the process block 612, the personalizing unit will add a PS load command to the message. At the process block 614, the personalizing unit will add a first date to the message indicating the date on which the message will become effective and a second date indicating the date on which the message will expire.

At the process block 616, the personalizing unit will sign the message using the personalizing unit's private key and the DSS. At this point, the message will become the initialization message of the secure chip 140. Next, the personalizing unit will advance to the block 618 to complete the creation of the initialization message and return to FIG. 5.

Figure 6B:
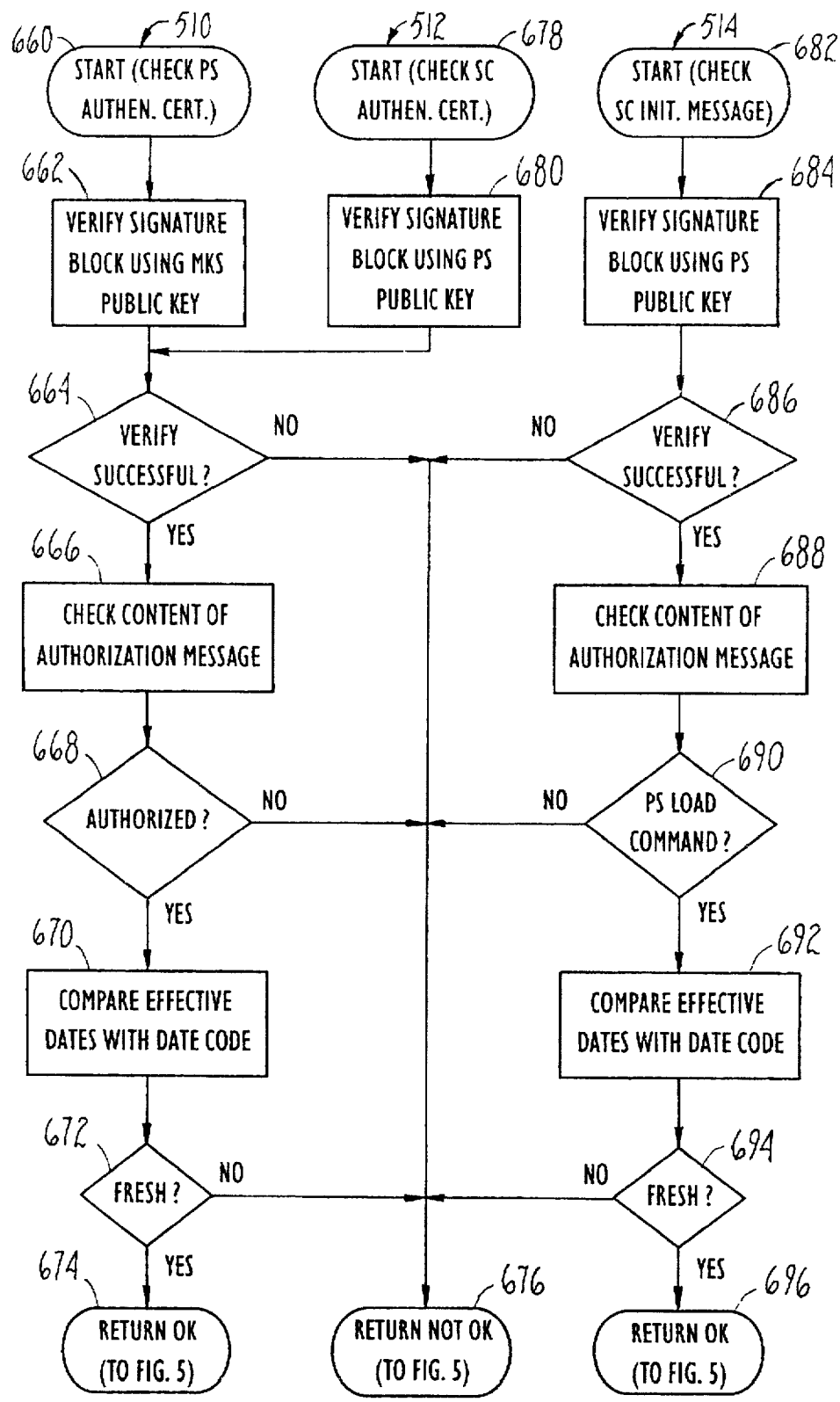
FIG. 6B illustrates a flowchart for the authentication and verification by a secure chip of the authentication certificate and the initialization message created by the processes of FIG. 6A.

FIG. 6B illustrates the processes for a secure chip 140 to check the authentication certificate of the personalizing unit, the authentication certificate of the secure chip 140, and the initialization message of the secure chip 140. These processes are generally similar to the processes described above with reference to FIG. 4B, except as indicated. The process for checking the authentication certificate of the personalizing unit, as represented by the process block 510 in FIG. 5, begins at a block 660. At a process block 662, the secure chip 140 applies the public signature key of the MKS 100 and the DSS to determine whether the authentication certificate of the personalizing unit was signed by the MKS 100.

At a decision block 664, the secure chip 140 will determine whether the signature verification was successful. If the verification was not successful, then the secure chip 140 will advance to a block 676. At this point, the secure chip 140 will return to the process of FIG. 5 with an error condition.

If the secure chip 140 determines that the signature verification was successful, then the secure chip 140 will advance to a process block 666. At this point, the secure chip 140 will check the content of the authorization data value in the authentication certificate. At a decision block 668, the secure chip 140 will determine whether the personalizing unit was authorized to personalize additional secure chips 140. If the personalizing unit was not authorized to personalize additional secure chips 140, then the secure chip 140 will advance to the block 676 and return to the process of FIG. 5 with an error condition.

If the secure chip 140 determines that the personalizing unit was authorized to personalize additional secure chips 140, then the secure chip 140 will advance to a process block 670. At the process block 670, the secure chip 140 will obtain the effective date and the expiration date of the authentication certificate, and compare these dates against the manufacturing date code of the secure chip 140. At a decision block 672, the secure chip 140 will determine whether the authentication certificate is fresh. If the certificate is not fresh, then the secure chip 140 will advance to the block 676 and return to the process of FIG. 5 with an error condition.

As described above, providing effective and expiration dates for the authentication certificates helps to defeat pirate attempts. A secure chip 140 will not accept personalization by a personalizing unit that has provided an authentication certificate for which the effective and expiration dates do not coincide with the secure chip 140's manufacturing date code. Thus, each authentication certificate will only be valid for a limited number of manufacturing date codes. As a result, a pirate that has managed to steal a personalizing unit will only be able to personalize a limited number of secure chips 140. To minimize the number of secure chips 140 that a pirate can personalize under these circumstances, the effective period for an authentication certificate should be relatively short. Consequently, a personalizing unit will typically be used for a time period that extends beyond the period of validity of the original authentication certificate. For this reason, the present invention provides a capability for the MKS 100 to communicate subsequent authentication certificates to the personalizing units of the system. FIG. 1 illustrates a communication line 119 over which the MKS 100 can transmit authentication certificates for the PS 106.

To provide additional safeguards, the personalization routine of the secure chip 140 should be performed by a programmable processing unit within the secure chip 140 by executing a program contained in ROM, where the ROM is also located on the secure chip 140. This will prevent a pirate from modifying the personalization routine of a secure chip 140 to avoid verifying the authentication certificate of the personalizing unit.

Returning to the decision block 672 of FIG. 6B, if the authentication certificate is fresh, then the secure chip 140 will advance to a block 674. At this point, the process of checking the authentication certificate of the personalizing unit will be successfully completed, and the secure chip 140 will return execution to FIG. 5.

The process for checking the authentication certificate of the secure chip 140, as represented by the process block 512 of FIG. 5, begins at a block 678. At a process block 680, the secure chip 140 will apply the public signature key of the personalizing unit and the DSS to verify whether the authentication certificate was signed by the personalizing unit. As described above, the public signature key of the personalizing unit is obtained from the authentication certificate of the personalizing unit.

At the decision block 664, the secure chip 140 will determine whether the signature verification was successful. If the verification was not successful, then the secure chip 140 will advance to the block 676 and return to the process of FIG. 5 with an error condition.

If the verification was successful, then the secure chip 140 will advance to the process block 666. At this point, the secure chip 140 will check the content of the authorization data value in the authentication certificate of the secure chip 140. At the decision block 668, the secure chip 140 will determine whether it has been authorized to perform its designated function. If it has not been properly authorized, then the secure chip 140 will advance to the block 676 and return to the process of FIG. 5 with an error condition.

If the secure chip 140 determines that it was properly authorized, then the secure chip 140 will advance to the process block 670. At this point, the secure chip 140 will compare the effective date and the expiration date of the authentication certificate with the manufacturing date code of the secure chip 140.

At the decision block 672, the secure chip 140 will determine whether the authentication certificate is fresh. If the certificate is not fresh, then the secure chip 140 will advance to the block 676 and return to the process of FIG. 5 with an error condition. If the certificate is fresh, then the secure chip 140 will advance to the block 674. At this point, the process for checking the authentication certificate of the secure chip 140 has been successfully completed and the secure chip 140 will return execution to FIG. 5.

The process for checking the initialization message of the secure chip 140, as represented by the process block 514 of FIG. 5, begins at a block 682. At a process block 684, the secure chip 140 applies the public signature key of the personalizing unit and the DSS to verify that the message was signed by the personalizing unit.

At a decision block 686, the secure chip 140 determines whether the signature verification was successful. If the verification was not successful, then the secure chip 140 will advance to the block 676 and return to the process of FIG. 5 with an error condition.

If the signature verification was successful, then the secure chip 140 will advance to a process block 688. At this point, the secure chip 140 will check the content of the authorization data value of the initialization message. At a decision block 690, the secure chip 140 will determine whether the message contains a PS load command. If not, then the secure chip 140 advances to the block 676 and returns to the process of FIG. 5 with an error condition. Otherwise, the secure chip 140 advances to a process block 692.

At the process block 692, the secure chip 140 compares the effective date and the expiration date of the initialization message against the manufacturing date code of the secure chip 140. At a decision block 694, the secure chip 140 determines whether the message is fresh. If not, then the secure chip 140 advances to the block 676 and returns to the process of FIG. 5 with an error condition. Otherwise, the secure chip 140 advances to a block 696. At this point, the process of checking the initialization message has been successfully completed and the secure chip 140 will return execution to FIG. 5.

Figure 7A:
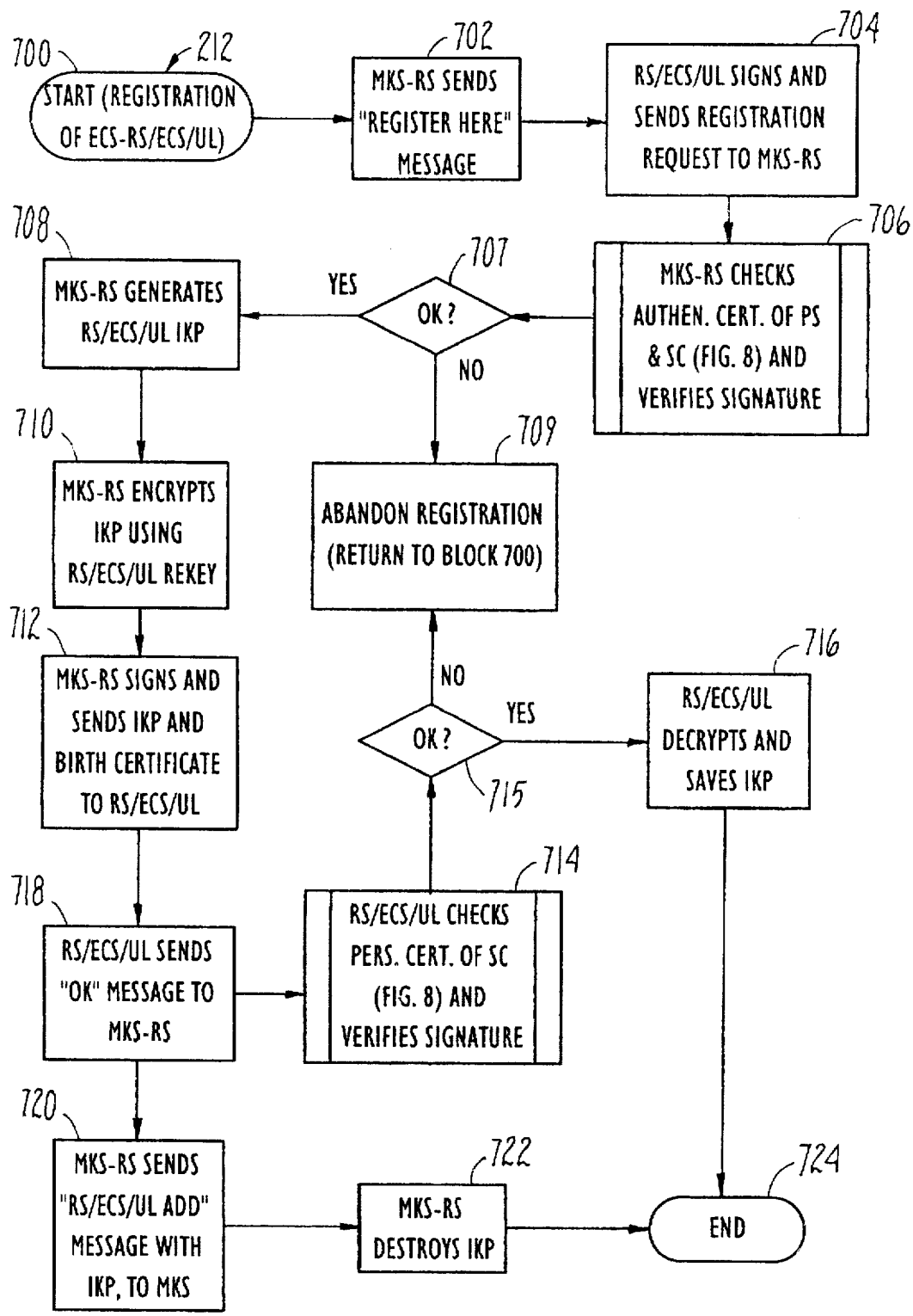
FIG. 7A illustrates a flowchart for the registration by an MKS-RS of an ECS, an ECS-RS and a UL of the system of FIG. 1.

FIG. 7A illustrates the process performed by the MKS-RS 102 to register the ECS-RS 110, the ECS 108 or the UL 112. This process is represented by the process block 212 in FIG. 2. The process begins at a block 700.

At a process block 702, the MKS-RS 102 sends a "register here" message on communication lines 120 and 122, shown in FIG. 1, to the ECS-RS 110, the ECS 108 or the UL 112. Appendix A5 contains a table indicating the general format of the "register here" message of the preferred embodiment. At a process block 704, the ECS-RS 110, the ECS 108 or the UL 112 will send a registration request to the MKS-RS 102 over communication line 120 or 122 in response to the "register here" message. Appendix A6 contains a table indicating the general format of the registration request of the preferred embodiment. The ECS-RS 110, the ECS 108 or the UL 112 will sign the "register here" message using its own private signature key. This signed copy of the "register here" message will form a part of the registration request. The registration request will also contain an authentication certificate of the requester and an authentication certificate of the requestor's personalizing unit. In this case, the requester will be an ECS-RS 110, an ECS 108, or a UL 112. Each of these units can only be personalized by the MKS-PS 104, so the registration request will contain an authentication certificate of the MKS-PS 104. This authentication certificate was communicated from the MKS-PS 104 to the secure chip 140 of the requesting unit in the process block 508 of FIG. 5.

At a process block 706, the MKS-RS 102 will check the authentication certificate of the MKS-PS 104 and the authentication certificate of the secure chip 140 of the requester. The authentication certificates provide a chain of authentication that links the requester to the MKS 100. In the present process, the MKS-RS 102 will verify that the authentication certificate of the MKS-PS 104 was signed by the MKS 100, and that the MKS 100 authorized the MKS-PS 104 to personalize additional secure chips 140. The MKS-RS 102 will also verify that the authentication certificate of the secure chip 140 was signed by the MKS-PS 104, and that the secure chip 140 is authorized to perform the appropriate functions for the requester. The MKS-RS 102 will also verify the signed copy of the "register here"

message using the public signature verification key of the requester, obtained from the requestor's authentication certificate. This process verifies that the requester has a private signature key that corresponds to the public signature verification key that has been indirectly authenticated by the MKS 100. The process of checking the authentication certificates will be described in greater detail below with reference to FIG. 8.

At a decision block 707, the MKS-RS 102 determines whether the requester has been authenticated and authorized, based on the check of the authentication certificates and the signature verification performed at the process block 706. If the requester has not been authenticated and authorized, then the process will advance to a process block 709. At this point, the MKS-RS 102 will abandon the registration process and return to the block 700 to restart the registration process. On the other hand, if the requester has been authenticated and authorized, then the process will advance to a process block 708.

At the process block 708, the MKS-RS 102 generates a cryptographic data element. The data element may comprise any information that can be used to establish a cryptographic link. For example, the data element may comprise an index or seed, an identifier or serial number, a secret key or an encryption key. In the preferred embodiment, the data element comprises an initial key package (IKP). Appendix A7 contains a table indicating the general format of the IKP of the preferred embodiment. For subscriber television systems using systems for controlling access to television programs, the IKP will comprise cryptographic information required by the particular access control system. In a preferred embodiment, the IKP will be a CSKEY and an Entitlement Key that are double-length DES key pairs compatible with ANSI X9.17-1985. Numerous other reliable private key encryption techniques can also be used. In fact, different private key encryption techniques can be used simultaneously to establish different secure communication links within the system. The registration station can indicate which technique (or techniques) will be used when the IKP is transmitted to the requester. This also allows the technique to be changed, even as to a specific communication link, during a re-registration process. The IKP will preferably be unique to a communication link that will be established between the MKS 100 and the requester, and it will not be given to any other element.

At a process block 710, the MKS-RS 102 encrypts the IKP using the requestor's public rekey key. The MKS-RS 102 obtains the requestor's public rekey key from the authentication certificate of the secure chip 140. The certificate was contained in the registration request. Only the requestor has the corresponding private rekey key.

At a process block 712, the MKS-RS 102 signs the IKP with its private signature key, and sends the encrypted and signed IKP to the requester along with the birth certificate of the MKS-RS 102. This message is also transmitted across the communication line 120 or the communication line 122. Because the IKP is encrypted in the requestor's rekey key and because the birth certificate does not have to remain private, the communication lines 120 and 122 need not be private. Any pirate that may be eavesdropping on these communication lines will not be able to obtain any valuable information. The birth certificate of the MKS-RS 102 contains the authentication certificate of the secure chip 140 of the MKS-RS 102. Generally, a birth certificate will also contain the authentication certificate of the personalizing unit that personalized the secure chip 140. However, the MKS-RS 102 was personalized by the MKS 100. The MKS 100 does not have an authentication certificate because it is the trusted authority.

At a process block 718, the requestor sends an "OK" message to the MKS-RS 102 over the communication line 120 or 122. This message indicates that the requester has received the IKP. After the process block 718, the process of FIG. 7A proceeds with a pair of step sequences that are performed in parallel. A first sequence comprises a process block 714, a decision block 715 and a process block 716. A second sequence comprises a process block 720 and a process block 722.

In the first sequence, at the process block 714, the requestor checks the authentication certificate of the secure chip 140 of the MKS-RS 102 and verifies the signature of the IKP. The process of checking the authentication certificate of the secure chip 140 of the MKS-RS 102 is similar to the process of checking the authentication certificate of the secure chip 140 of the requestor in the process block 706. The present process is described in greater detail below with reference to FIG. 8.

At the decision block 715, the requester determines whether the MKS-RS 102 has been authenticated and authorized, based on the check of the authentication certificate and the signature verification performed at the process block 714. If the MKS-RS 102 has not been authenticated and authorized, then the procedure of FIG. 7A will advance to the process block 709 and the registration will be abandoned. If the MKS-RS 102 has been authenticated and authorized, then the process of FIG. 7A will advance to the process block 716. At the process block 716, the requester applies its private rekey key to decrypt the message containing the IKP. The requester then saves these keys for future communications with the MKS 100. After the process block 716, the first sequence is complete.

In the second sequence, at the process block 720, the MKS-RS 102 sends an "ECS-RS/ECS/UL Add" message to the MKS 100. This message will contain the IKP that was sent to the requester. This message will also contain identifying information related to the requester, so that the MKS 100 can begin to send appropriate messages and information to the requester. This message must be communicated in a secure environment. However, the MKS-RS 102 is preferably located in the same location as the MKS 100. Thus, the same security measures that are utilized to ensure the security of the MKS 100 can also be used to ensure the security of the communication link between the MKS 100 and the MKS-RS 102.

At the process block 722, the MKS-RS 102 will destroy any copies of the IKP that it has retained. The MKS 100 can now use the IKP corresponding to the specific requester to establish a private communication link with the requester. After the process block 722, the second sequence is complete. The registration of the ECS-RS 110, the ECS 108, or the UL 112 will end at a block 724, after completion of both the first and the second sequences.

Figure 7B:
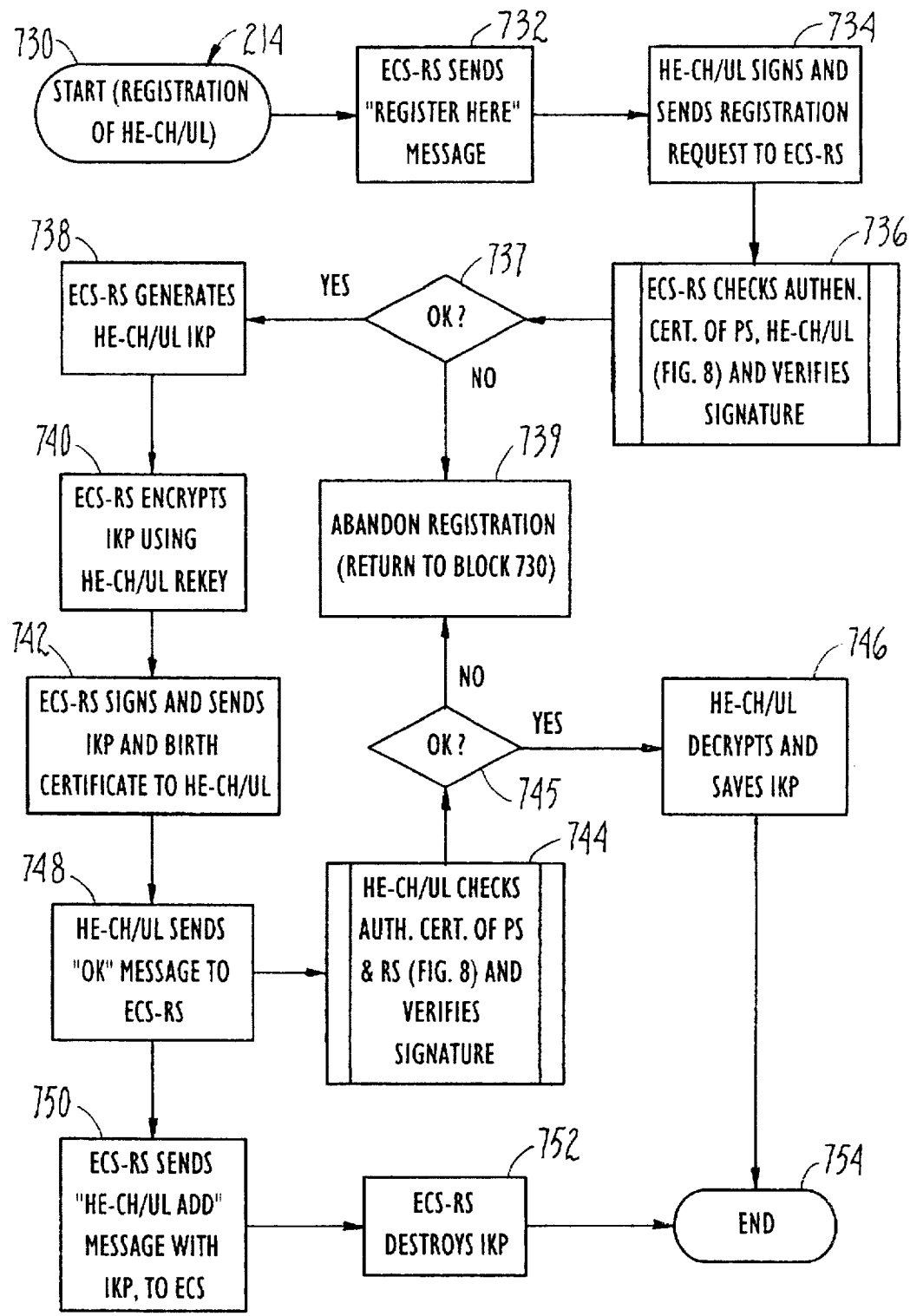
FIG. 7B illustrates a flowchart for the registration by an ECS-RS of a channel of an HE of the system of FIG. 1.

FIG. 7B illustrates the process performed by the ECS-RS 110 to register a UL 112 or a channel 142 of a head end 114, as represented by the process block 214 of FIG. 2. This process is generally similar to the process of FIG. 7A, except as indicated. The process begins at a block 730.

At a process block 732, the ECS-RS 110 sends a "register here" message to the head end 114 over the communication line 126 or to the UL 112 over the communication line 132. Upon receipt of this message, the head end channel 142 or the UL 112, at a process block 734, sends a registration request to the ECS-RS 110, over the respective communication line 126, 132. The head end channel 142 or the UL 112 will sign the "register here" message using its own private signature key. This signed copy of the "register here" message will form a part of the registration request. The registration request will also contain the authentication certificate of the requester and the authentication certificate of the personalization station 106 or the MKS-PS 104 that personalized the secure chip 140 of the requester. As described above, the communication lines 126, 132 are preferably ordinary computer network lines. A message transmitted over these computer network lines 126, 132 will include a message header that will contain the computer network address corresponding to the head end channel 142 or the UL 112. This address will identify the location of the head end channel 142 or the UL 112 to the ECS-RS 110. The message may also contain additional identification information.

At a process block 736, the ECS-RS 110 checks the authentication certificates of the PS 106 or MKS-PS 104 and the requester. This process is generally similar to the process of checking authentication certificates performed by the MKS-RS 102 in the process block 706 of FIG. 7A. This process is described in greater detail below with reference to FIG. 8. In addition, at the process block 736, the ECS-RS 110 verifies the signed copy of the "register here" message using the public signature verification key of the requester, obtained from the requestor's authentication certificate. This process verifies that the requester has a private signature key that corresponds to the public signature verification key that has been indirectly authenticated by the MKS 100.

At a decision block 737, the ECS-RS 110 determines whether the requestor has been authenticated and authorized, based on the check of the authentication certificates and the signature verification performed at the process block 736. If the requestor has not been authenticated and authorized, then the process will advance to a process block 739. At this point, the ECS-RS 110 will abandon the registration process and return to the block 730 to restart the registration process. If the requester has been authenticated and authorized, then the process will advance to a process block 738.

At the process block 738, the ECS-RS 110 generates a cryptographic data element. Again, the data element may comprise any information that can be used to establish a cryptographic link. In the preferred embodiment, the data element comprises an IKP. At a process block 740, the ECS-RS 110 encrypts the new IKP using the public rekey key of the requester. This public key was obtained from the authentication certificate of the requester.

At a process block 742, the ECS-RS 110 signs the IKP using its private signature key, and sends the encrypted IKP to the requester over the communication lines 126, 132. The ECS-RS 110 also sends a birth certificate to the requester over the communication lines 126, 132. The birth certificate will contain the authentication certificate of the ECS-RS 110 and the authentication certificate of the MKS-PS 104. In addition, the birth certificate will contain a message indicating that the secure chip 140 of the ECS-RS 110 will have the authority to operate as an ECS-RS 110. Again, this communication need not be made in a secure environment because the only valuable information communicated, the IKP, is encrypted in the public rekey key of the requester.

At a process block 748, the requester will send an "OK" message to the ECS-RS 110 over the communication lines 126, 132. This message will indicate that the requester has received the IKP. After the process block 748, the process of FIG. 7B proceeds with a pair of step sequences that are performed in parallel. A first sequence comprises a process block 744, a decision block 745, and a process block 746. A second sequence comprises a process block 750 and a process block 752.

In the first sequence, at the process block 744, the requestor checks the authentication certificate of the ECS-RS 110 and the MKS-PS 104, and verifies the signature of the IKP. The requester will verify that the authentication certificate of the MKS-PS 104 was signed by the MKS 100 and that the MKS 100 granted authority to the MKS-PS 104 to personalize additional secure chips 140. Also, the requester will check the authentication certificate of the ECS-RS 110 to verify that the certificate was signed by the appropriate MKS-PS 104 and that the ECS-RS 110 was granted the authority to function as a registration station. This process is described in greater detail below with reference to FIG. 8.

At the decision block 745, the requester determines whether the ECS-RS 110 has been authenticated and authorized, based on the check of the authentication certificates and the signature verification performed at the process block 744. If the ECS-RS 110 has not been authenticated and authorized, then the procedure of FIG. 7B will advance to the process block 739 and the registration will be abandoned. If the ECS-RS 110 has been authenticated and authorized, then the process of FIG. 7B will advance to a process block 746.

At the process block 746, the requestor applies its own private rekey key to the encrypted IKP received from the ECS-RS 110 and saves the resulting keys. The requester will not give these keys to any other element. After the process block 746, the first sequence is complete.

In the second sequence, at the process block 750, the ECS-RS 110 sends a "head end channel add" or an "up link add" message, along with the new IKP, to the ECS 108. This message will also contain identifying information related to the head end channel 142 or the UL 112. This communication must be executed in a secure environment. Preferably, the ECS-RS 110 and the ECS 108 are both located in the same facility, and there are adequate precautions to ensure a secure environment. At the process block 752, the ECS-RS 110 will destroy any copies of the IKP that it has retained. At this point, the ECS 108 and the head channel 142 can establish a private communication link using the new IKP over the communication line 124, or the ECS 108 and the UL 112 can establish a private communication link using the new IKP over the communication line 132. After the process block 752, the second sequence is complete. The registration of the head end channel 142 or the UL 112 will end at a block 754, after completion of both the first and the second sequences.

Figure 7C:
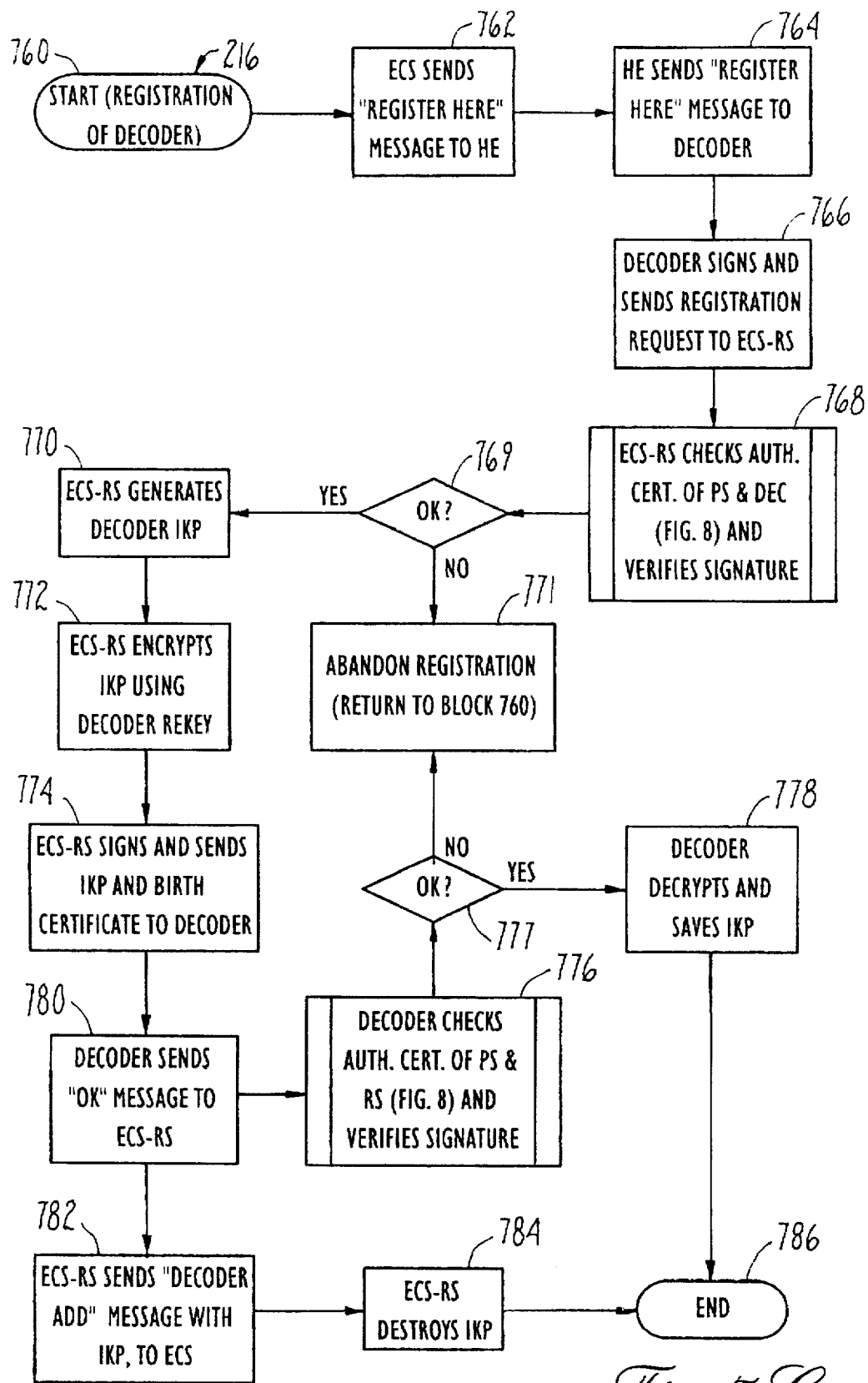
FIG. 7C illustrates a flowchart for the registration by an ECS-RS of a DEC of the system of FIG. 1.

FIG. 7C illustrates a process performed by the ECS-RS 110 to register a decoder 116, 118, as represented by the process block 216 in FIG. 2. This process is generally similar to the process of FIG. 7A, except as indicated. The process begins at a block 760.

At a process block 762, the ECS 108 sends a "register here" message to the head end 114 over the communication line 124 and to the UL 112 over the communication line 132. This message will contain a telephone number for the ECS-RS 110 and information about the location of the head end 114 or UL 112 from which the message was received. At a process block 764, the head end 114 and the UL 112 repetitively send the "register here" message to the decoders 116, 118 over the communication lines 134, 128, 136, 138.

In the preferred embodiment, a decoder 116, 118 that has not yet been registered cannot understand any message or data that it receives, except for the "register here" message, because all other information is encrypted, and the decoder 116, 118 does not yet have the necessary keys to decrypt any of the information.

At a process block 766, the decoder 116, 118 establishes a telephone link with the ECS-RS 110 over the communication line 130, 131 using the telephone number obtained from the "register here" message. The decoder 116, 118 sends the ECS-RS 110 a registration request. The decoder 116, 118 will sign the "register here" message using its own private signature key. This signed copy of the "register here" message will form a part of the registration request. The registration request will also contain the authentication certificate of the decoder 116, 118 and the authentication certificate of the personalization station 106 that personalized the decoder 116, 118. The registration request will also contain identification information about the decoder 116, 118, such as a decoder serial number from a security element within the decoder box 116, 118. As described above, the "register here" message contains the identification of the head end 114 or the UL 112 sending the message. The "register here" message and the decoder serial number, coupled with the telephone number from which the decoder 116, 118 calls provide sufficient information to identify the subscriber corresponding to the decoder 116, 118. The telephone number from which the decoder calls can be obtained using an Automatic Number Identification (ANI) feature of modern telephone systems. In the rare cases where ANI is not available, the telephone number can be programmed into the security element of the decoder box 116, 118, as part of a process for installing a decoder 116, 118 into a subscriber's location. The subscriber's telephone number can then be included in the registration request. The above-described information will enable the ECS 108 to associate a particular set of decoder box keys to a particular subscriber to allow the subscriber to view the correct programs by unscrambling selected video signals. Alternatively, there are numerous other methods by which an ECS 108 can be informed as to which decoder box 116, 118 should be associated with which subscriber. Also, some implementations of the present invention may allocate to other units of a system the functions of determining which decoder boxes 116, 118 should be allowed to unscramble which video signals.

At a process block 768, the ECS-RS 110 checks the authentication certificate of the decoder 116, 118 and the PS 106. This process is similar to the process of checking authentication certificates of the process block 736 in FIG. 7B. This process is described in greater detail below with reference to FIG. 8. The ECS-RS 110 will also verify the signed copy of the "register here" message using the public signature verification key of the decoder box 116, 118, obtained from the authentication certificate of the decoder box 116, 118. This process verifies that the decoder box 116, 118 has a private signature key that corresponds to the public signature verification key that has been indirectly authenticated by the MKS 100. At a decision block 769, the ECS-RS 110 determines whether the decoder box 116, 118 has been authenticated and authorized, based on the check of the authentication certificates and the signature verification performed at the process block 768. If the decoder box 116, 118 has not been authenticated and authorized, then the process will advance to a process block 771. At this point, the ECS-RS 110 will abandon the registration process and return to the block 760 to restart the registration process. If the decoder box 116, 118 has been authenticated and authorized then the process will advance to a process block 770.

At the process block 770, the ECS-RS 110 generates a cryptographic data element. Again the data element may comprise any information that can be used to establish a cryptographic link. In the preferred embodiment, the data element comprises an IKP. The new IKP will be used to establish a secure communication link between the ECS 108 and the decoder box 116, 118. Messages between the ECS 108 and the cable decoder box 116 can be transmitted over either of two message paths. First, the ECS 108 can transmit a message over the communication line 124 to the head end 114, which will then transmit the message over communication line 134 to the decoder box 116, 118. Alternatively, the ECS 108 can transmit a message over communication line 132 to the UL 112. Then, the UL 112 can transmit the message along communication line 128 to the head end 114, which will then transmit the message over communication line 134 to the decoder box 116. Messages between the ECS 108 and the satellite decoder box 118 can also be transmitted over either of two message paths. In either path, the ECS 108 will transmit a message over the communication line 132 to the UL 112. Then the UL 112 will either transmit the message directly to the satellite decoder box 118 over communication line 138, or it will transmit the message to the HE 114 over communication line 128. The HE 114 will then relay the message to the decoder box 118 over the communication line 136. These communication paths will be well-known to a person of skill in the art.

At a process block 772, the ECS-RS 110 will encrypt the new IKP into the public rekey key of the decoder 116, 118. The ECS-RS 110 obtains this public rekey key from the authentication certificate of the decoder 116. The certificate was contained in the registration request.

At a process block 774, the ECS-RS 110 signs the IKP with its private signature key, and sends the encrypted IKP along with a birth certificate, to the decoder 116, 118 over the communication line 130, 131. Again, the communication line 130, 131 need not be a secure communication link, because the only valuable information, the IKP, is encrypted in the public rekey key of the decoder 116, 118. The birth certificate will contain the authentication certificate of the ECS-RS 110 and the authentication certificate of the MKS-PS 104. The birth certificate will also contain a message indicating that the secure chip 140 of the decoder 116, 118 is authorized to operate as a decoder 116, 118.

At a process block 780, the decoder 116, 118 will send an "OK" message to the ECS-RS 110 over the communication line 130, 131. This message indicates that the decoder 116, 118 has received the IKP. The decoder 116, 118 will then terminate the telephone call over the communication line 130, 131. After the process block 780, the process of FIG. 7C proceeds with a pair of step sequences that are performed in parallel. A first sequence comprises a process block 776, a decision block 777 and a process block 778. A second sequence comprises a process block 782 and a process block 784.

In the first sequence, at the process block 776, the decoder 116, 118 checks the authentication certificate of the ECS-RS 110 and the MKS-PS 104 and verifies the IKP signature. The process of checking the authentication certificates is similar to the process of checking authentication certificates of the process block 744 in FIG. 7B and will be described in greater detail below with reference to FIG. 8.

At the decision block 777, the decoder 116, 118 determines whether the ECS-RS 110 has been authenticated and authorized, based on the check of the authentication certificate and the signature verification performed at the process block 776. If the ECS-RS 110 has not been authenticated and authorized, then the procedure of FIG. 7C will advance to the process block 771 and the registration will be abandoned. If the ECS-RS 110 has been authenticated and authorized, then the process of FIG. 7C will advance to the process block 778.

At the process block 778, the decoder 116, 118 applies its own private rekey key to decrypt the message containing the IKP. The decoder 116, 118 then saves the keys for future use in decrypting messages encrypted by the ECS 108. The decoder 116, 118 will not give any other element access to these keys. After the process block 778, the first sequence is complete.

In the second sequence, at the process block 782, the ECS-RS 110 sends a "decoder add" message, along with the new IKP, to the ECS 108. This message will also contain identifying information related to the decoder 116, 118. Again, this message must be communicated in a secure environment. Next, at the process block 784, the ECS-RS 110 destroys any copies of the IKP that it has retained. Now the ECS 108 and the decoder box 116, 118 can establish a secure communication link using the new IKP. After the process block 784, the second sequence is complete. The registration of the decoder 116, 118 will end at a block 786, after completion of both the first and the second sequences.

Figure 8:
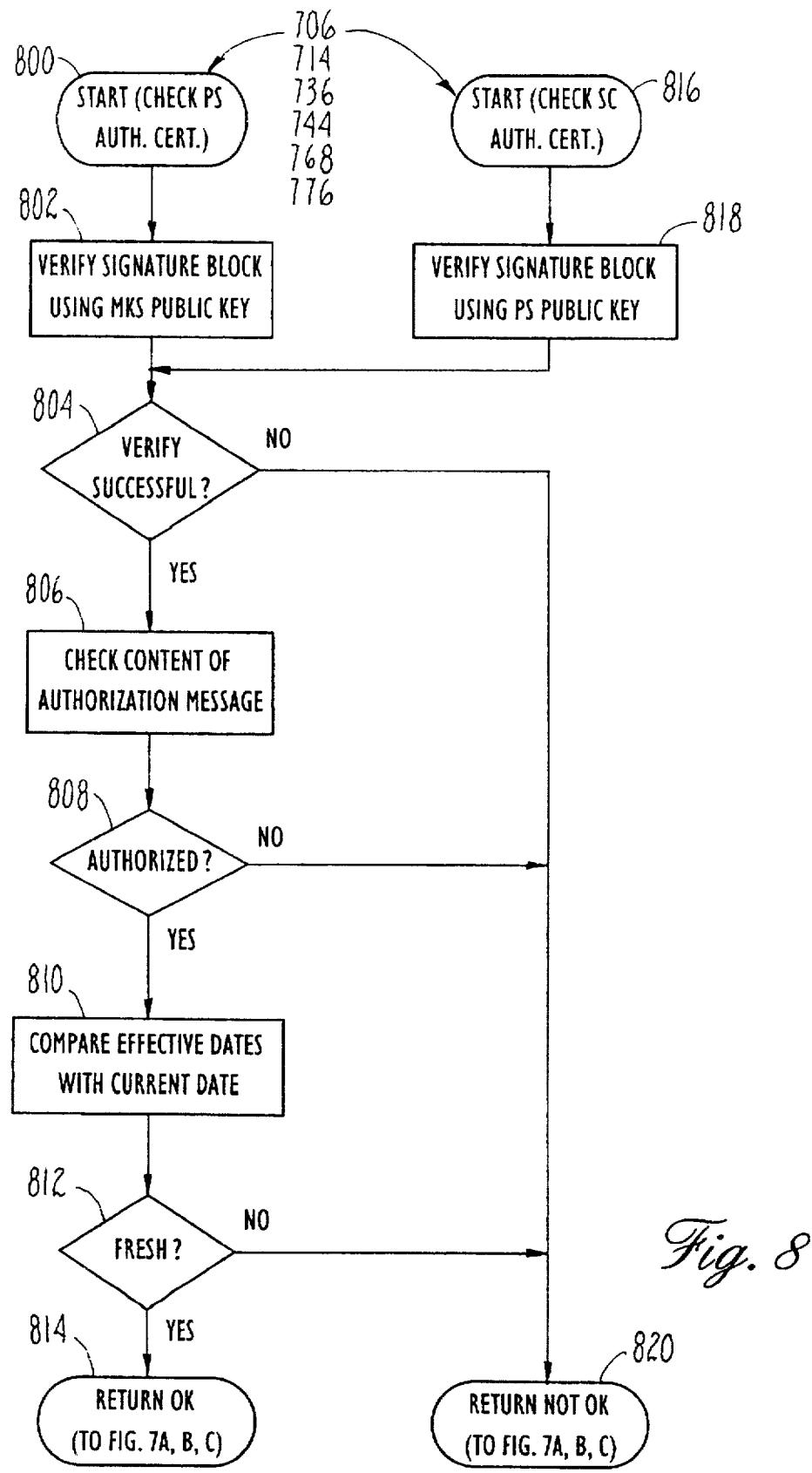
FIG. 8 illustrates a flowchart for the authentication and verification of the authentication certificates exchanged during the registration processes of FIGS. 7A, 7B and 7C.

FIG. 8 illustrates the processes for checking an authentication certificate of both a personalizing unit and a secure chip 140. The personalizing unit may be a PS 106 or an MKS-PS 104. The secure chip 140 may be for an MKS-RS 102, an ECS-RS 110, an ECS 108, a UL 112, an HE channel 142, or a decoder 116, 118. These processes are represented by the process blocks 706, 714, 736, 744, 768 and 776 of FIG. 7. These processes will generally be similar to the processes represented by the process blocks 510 and 512 of FIG. 5, except as indicated. These processes will be executed by a verifying unit constituting an MKS-RS 102, an ECS-RS 110, an ECS 108, a UL 112, a head end channel 142, or a decoder box 116, 118.

The process for checking the authentication certificate of a personalizing unit begins at a block 800. At a process block 802, the verifying unit applies the public signature key of the MKS 100 and the DSS to verify that the certificate was signed by the MKS 100. At a decision block 804, the verifying unit determines whether the signature verification was successful. If not, then the verifying unit proceeds to a block 820. At this point, the process for checking the authentication certificate ends with an error condition. If the verification was successful, then the verifying unit will proceed to a process block 806.

At the process block 806, the verifying unit will check the content of the authorization data value of the certificate. At a decision block 808, the verifying unit will determine whether the personalizing unit was authorized to personalize the secure chip 140. If not, then the verifying unit will proceed to the block 820 and end the process with an error condition. Otherwise, the verifying unit will advance to a process block 810.

At the process block 810, the verifying unit will compare the effective date and the expiration date of the authentication certificate against the current calendar date. At a decision block 812, the verifying unit will determine whether the certificate is fresh. If not, the verifying unit will advance to the block 820 and end the process with an error condition. Otherwise, the verifying unit will advance to a block 814. At this point, the process of checking the certificate is complete and the verifying unit will return with no error condition.

As an additional safeguard against pirates, the registration routine of a verifying unit can be executed by a programmable processing unit on the secure chip 140, where the program is contained in ROM on the secure chip 140. This will prevent a pirate from avoiding the verification process.

The process for checking the authentication certificate of the secure chip 140 of the unit that is currently being authenticated begins at a block 816. At a process block 818, the verifying unit applies the public signature key of the personalizing unit (obtained from the authentication certificate of the personalizing unit) and the DSS to verify that the certificate was signed by the personalizing unit. At the decision block 804, the verifying unit determines whether the signature verification was successful. If not, the verifying unit advances to the block 820 and ends the process with an error condition. Otherwise, the verifying unit advances to the process block 806.

At the process block 806, the verifying unit checks the content of the authorization data value in the certificate. At the decision block 808, the verification unit determines whether the secure chip 140 of the unit being authenticated has been authorized to perform the appropriate functions. If not, then the verifying unit advances to the block 820 and ends the process with an error condition. Otherwise, the verifying unit advances to the process block 810.

At the process block 810, the verifying unit compares the effective date and the expiration date of the certificate against the current date. At the decision block 812, the verifying unit determines whether the certificate is fresh. If not, then the verifying unit advances to the block 820 and ends the process with an error condition. Otherwise, the verifying unit advances to the block 814. At this point, the verifying unit has successfully completed the check of the authentication certificate and returns to FIG. 7.

The method of the present invention will establish a number of secure communication links between different elements of the subscriber television system. The MKS 100 will have a secure communication link with each of the ULs 112 in the system over the communication line 120. Also, the MKS 100 will have a secure communication link with each of the ECSs 108 in the system over the communication line 122. The ECS 108 will have a secure communication link with the ULs 112 over the communication line 132. Each of the ECSs 108 will establish a secure communication link with each of the head end channels 142 over the communication line 124. Each of the ECSs 108 in the system will establish a secure communication link with each of the cable decoder boxes 116 over the communication lines 124 and 134, through the head end 114, and over the communication lines 132, 128 and 134 through the UL 112 and the head end 114. Also, each of the ECs 108 in the system will establish a secure communication link with each of the satellite decoder boxes 118 over the communication lines 132 and 138, through the UL 112, and over the communication lines 132, 128 and 136, through the UL 112 and the HE 114. Private communication messages can now be transferred across the secure communication links using the keys from the IKP loaded during the registration process.

As described above, the uplink 112 transmits video signals to the head end 114 over the communication line 128 and to the satellite decoder box 118 over the communication line 138. One or more of these video signals may be scrambled. The head end 114 may unscramble one or more of the scrambled video signals received from the uplink 112.

The head end 114 will then transmit video signals to the various cable decoder boxes 116 in the system over the communication line 134 and to the various satellite decoder boxes 118 over the communication line 136. One or more of the video signals received by the decoder box 116, 118 may have been scrambled either by the head end 114 or the uplink 112. The decoder box 116, 118 may unscramble one or more of the scrambled video signals that it receives.

With the above-described secure communication links, the ECS 108 can now control which channels each of the head ends 114 and each of the decoder boxes 116, 118 can unscramble. The ECS 108 will transmit a variety of keys to the uplink 112 over the communication line 132 using the secure communication link. The uplink 112 can use these various keys to scramble some or all of the video signals under the direction of the ECS 108. The ECS 108 can then control which video signals can be unscrambled by the head end 114 by only sending the head end 114 the keys that correspond to the scrambled video signals for which reception is authorized at the head end 114. These keys will be transmitted from the ECS 108 to the head end 114 over the communication line 124 using the secure communication link.

Similarly, the ECS 108 will send a variety of keys to the head end 114 over the communication line 124 using the secure communication link. The head end 114 will use this variety of keys to scramble, under the direction of the ECS 108, one or more of the video signals sent to the cable decoder boxes 116 over the communication line 134. The ECS 108 can now send selected keys to the different decoder boxes 116, 118 of the system to allow the decoder box 116, 118 to unscramble selected video signals that have been scrambled either by the uplink 112 or the head end 114. These keys will be transmitted from the ECS 108 to the cable decoder box 116 over the communication line 124, through the head end 114, and over the communication line 134, using the secure communication link. Alternatively, the ECS 108 can send the keys over the communication line 132, through the uplink 112, over the communication line 128, through the head end 114, and over the communication line 134, using the secure communication link. The ECS 108 will transmit keys to the satellite decoder box 118, over the communication line 132, through the uplink 112, and over the communication line 138, using the secure communication link. Alternatively, the ECS 108 can send the keys over the communication line 132, through the uplink 112, over the communication line 128, through the head end 114, and over the communication line 136, again using the secure communication link.

As an example of an entitlement system for a subscriber television system, assume a system with video channels 2, 3 and 4 and a cable decoder box 116 and a satellite decoder box 118. Assume that the UL 112 transmits the video signals for channels 2, 3 and 4 to the HE 114 over communication line 128 and to the satellite decoder box 118 over the communication line 138. Also, assume that the HE 114 transmits the video signals for channels 2, 3 and 4 to the cable decoder box 116 over the communication line 134. The ECS 108 may send encryption keys A and B to the UL 112 with instructions to scramble channel 2 using key A and channel 3 using key B. The ECS 108 may then send keys B, C and D to the HE 114 with instructions to unscramble channel 3 using key B, insert some local programming information, and then rescramble the video signal using key C. The ECS 108 may also instruct the HE 114 to scramble channel 4 using key D. If the subscriber with the cable decoder box 116 has paid for channels 2 and 3, then the ECS 108 will send keys A and C to the satellite decoder box 116 with instructions to unscramble channel 2 using key A and to unscramble channel 3 using key C. If the subscriber with the satellite decoder box 118 has paid for channels 3 and 4, then the ECS 108 will send keys B and D to the satellite decoder box 118 with instructions to unscramble channel 3 using key B and to unscramble channel 4 using key D.

A person of skill in the art will understand from the above disclosure which keys in an entitlement system should be sent to each of the uplinks 112, to each of the head end channels 142, and to each of the decoder boxes 116, 118 in a subscriber television system. A person of skill in the art will also understand the type of key that should be used based on the particular scrambling technique that is chosen. The preferred embodiment of the present invention will use a digital scrambling technique, several of which are disclosed in the prior art; although an analog technique could also be used.

The method of the present invention, as applied to a subscriber television system, for distributing keys for scrambling and unscrambling video signals is a significant advance over existing subscriber television systems. Existing subscriber television systems are typically implemented using decoder boxes that contain a key permanently stored therein. Unlike the permanent storage of the public signature key of the MKS 100 in the present invention, the keys stored in prior art decoder boxes function as private encryption keys for the decoder box. If a key of a decoder box is compromised, then each of the decoder boxes in the system, relying on that key, must be replaced. In an alternative design, each of the decoder boxes contains a replaceable security cartridge, where the key is permanently stored in the cartridge. In this type of system, if a security key is compromised, then each of the security cartridges, which contain that key, must be replaced. In a subscriber television system incorporating the present invention, there is no need to have a private security key permanently associated with a given decoder box. If a decoder box unscrambling key has been compromised, then any decoder box utilizing that specific key can have a new key transmitted over a secure communication link, or the decoder box can be re-registered to again establish a secure communication link. The re-registration process can be performed without any hardware change, saving large sums of money. In addition, the capability of the present invention to remotely download new keys to decoder boxes, instead of providing each decoder box with a permanent key, eliminates the need to track the permanent keys of various decoder boxes at a central location. Instead, a more local ECS 108 can track the downloaded keys for the decoder boxes within its control. This feature also allows decoder boxes and other equipment to be easily transferred to other subscriber television systems using the same or a compatible system.

A person of skill in the art will be able to apply the concepts of the present invention to establish different secure communication links in different communication systems, and also in systems for which communication is not a primary objective. For other systems, the functions of the MKS 100, the MKS-RS 102, the MKS-PS 104 and the PS 106 can remain the same. However, different operational units will generally be required. Every operational unit, however, will still contain a secure chip 140. The ECS 108, the ECS-RS 110, the UL 112, the HE 114 and the decoder boxes 116, 118 may be replaced with different operational units that perform the required operational functions of the different system. However, each of the secure chips 140 will be personalized according to the method of the present invention and the operational units will be registered according to the method of the present invention. The functions performed by these different operational units, that are not related to establishing a secure cryptographic network, can vary widely. Other systems may also use the MKS-RS 102 to perform all registrations instead of having a separate registration station, such as the ECS-RS 110.

APPENDIX A1

Authentication Certificate for a PS, an MKS-PS or an MKS-RS

Certificate Header
    Certificate ID
    Issuer ID (=MKS)
    Issuers Certificate ID (=NULL)
    Effective Date
    Expiration Date
Authorization Block
    Authorization (=PS, MKS-PS, or MKS-RS)
    Authorized ID
Public Signature Key
    Key Header
        Variable Type (=Public Signature Key)
        Key ID
        Effective Date
        Expiration Date
    Public Signature Key Data
Signature Block
    Public Signature Key ID (=MKS Public Signature Key)
    Hash Algorithm ID
    Signature Algorithm ID
    Signature Data

APPENDIX A2

Initialization Message for a PS, an MKS-PS or an MKS-RS

Certificate Header
    Certificate ID
    Issuer ID (=MKS)
    Issuers Certificate ID (=NULL)
    Effective Date
    Expiration Date
Authorization Block
    Authorization (=PS load, MKS-PS load, or MKS-RS load)
    Authorized ID
Private Signature Key
    Key Header
        Variable Type (=Private Signature Key)
        Key ID
        Effective Date
        Expiration Date
    Private Signature Key Data
Signature Block
    Public Signature Key ID (=MKS Public Signature Key)
    Hash Algorithm ID
    Signature Algorithm ID
    Signature String

APPENDIX A3

Authentication Certificate for a HE, a Decoder, an ECS-RS or a UL

Certificate Header
    Certificate ID
    Issuer ID (=PS ID)
    Issuers Certificate ID (=ID of PS's certificate)
    Effective Date
    Expiration Date
Authorization Block
    Authorization (=HE or Decoder)
    Authorized ID
Public Signature Key
    Key Header
        Variable Type (=Public Signature Key)
        Key ID

APPENDIX A3-continued

Authentication Certificate for a HE, a Decoder, an ECS-RS or a UL

Effective Date
        Expiration Date
    Public Signature Key Data
Public Encryption Key
    Variable Type (=Public Encryption Key)
    Key ID
    Effective Date
    Expiration Date
    Public Encryption Key Data
Signature Block
    Public Signature Key ID (=PS Public Signature Key)
    Hash Algorithm ID
    Signature Algorithm ID
    Signature Data

APPENDIX A4

Initialization Message for a HE, a Decoder, an ECS-RS or a UL

Certificate Header
    Certificate ID
    Issuer ID (=PS ID)
    Issuers Certificate ID (=ID of PS's certificate)
    Effective Date
    Expiration Date
Authorization Block
    Authorization (=HE load or Decoder load)
    Authorized ID
Private Signature Key
    Key Header
        Variable Type (=Private Signature Key)
        Key ID
        Effective Date
        Expiration Date
    Private Signature Key Data
Private Encryption Key
    Key Header
        Variable Type (=Private Encryption Key)
        Key ID
        Effective Date
        Expiration Date
    Private Encryption Key Data
Signature Block
    Public Signature Key ID (=PS Public Signature Key)
    Hash Algorithm ID
    Signature Algorithm ID
    Signature Data

APPENDIX A5

"Register Here" Message
Certificate Header
    Certificate ID
    Issuer ID (=MKS)
    Issuers Certificate ID (=NULL)
    Effective Date
    Expiration Date
Authorization Block
    Authorization (=Register Here)
    Authorization ID (NULL or specific ID)
Data Block (containing the ID, telephone number or network address of the ECS-RS designated as the registration point for all units receiving this message).
Signature Block
    Public Signature Key ID (=MKS Public Signature Key)
    Hash Algorithm ID
    Signature Algorithm ID
    Signature Data

APPENDIX A6

Registration Request

Certificate Header
  Certificate ID
  Issuer ID (=ID of requesting unit)
  Issuers Certificate ID (=ID of requesting unit's certificate)
  Effective Date
  Expiration Date
Authorization Block
  Authorization (=Registration Request)
  Authorization ID (ID of ECS-RS designated in register here message)
Data Block (containing the register here message which stimulated this request)
Signature Block
  Public Signature Key ID (=ID of unit requesting registration)
  Hash Algorithm ID
  Signature Algorithm ID
  Signature Data

APPENDIX A7

Initial Key Package

Certificate Header
  Certificate ID
  Issuer ID (=RS ID)
  Issuers Certificate ID (=ID of RS's certificate)
  Effective Date
  Expiration Date
Authorization Block
  Authorization (=Key Package)
  Authorized ID (ID of unit authorized to load this Key Package)
Encrypted Key
  Key Header
    Variable Type (=Encrypted Key Package for a specific application)
    Key ID
    Effective Date
    Expiration Date
  Decryption Algorithm ID
  Decryption Key ID
  Encrypted Key Data (the encrypted key data required by the specific application)
Signature Block
  Public Signature Key ID (=ECS-RS Public Signature Key)
  Hash Algorithm ID
  Signature Algorithm ID
  Signature Data

APPENDIX A8

Field Type Definitions:

Authorization—A specific action or role the entity named in the Authorized ID is authorized or permitted to perform. The signer of this certificate grants this authorization by signing the certificate containing this authorization.
Authorization Block—An authorization for a named entity to perform a particular action or act in a particular role.
Authorized ID—The unique identifier (i.e., name) of the entity granted the associated authorization.
Certificate Header—A block of information at the beginning of every certificate which identifies the certificate in terms of its source, its parent in a certificate chain, and its effective period.
Certificate—A block of information consisting of a Certificate Header, zero or more Authorization Blocks, zero

APPENDIX A8-continued

Field Type Definitions:

of more Keys (Public, Private, or Encrypted), zero or more Data Blocks, and a Signature Block. All valid certificates are traceable via an authentication chain to a Masters Public Signature Key held in Read only Memory (ROM) by all entities.
Certificate ID—An identification field (e.g. serial number) unique to this certificate.
Data Block—A Block of data bytes with an application specific content and meaning.
Data Block Data—The information bearing portion of a Data Block
Data Block Length—The length of the Data Block Data portion of a Data Block.
Decryption Algorithm ID—A code identifying the specific decryption algorithm needed to decrypt the associated Encrypted Key Data.
Decryption Key ID—The Key ID of the key needed to decrypt the associated Encrypted Key Data.
Effective Date—The earliest date that any of the data (i.e., authorization block, keys, other data) contained in this certificate may be considered valid for use by any entity receiving this certificate.
Encrypted Key—A block of information containing a Key Header, a Decryption Algorithm ID, a Decryption Key ID, and Encrypted Key Data. This information is sufficient for an authorized entity to decrypt the key.
Encrypted Key Data—The actual key in its encrypted form. The content of this field is dependent on the Variable Type and Decryption Algorithm.
Expiration Date—The last date that any of the data (i.e., authorization block, keys, and other data) contained in this certificate may be considered valid for use by any entity receiving this certificate.
Hash Algorithm ID—A code identifying the specific hash algorithm used in generating this signature.
Issuer's Certificate ID—The Certificate ID of the Public Certificate containing the Issuer's public Signature Key used to verify this certificate and the authority to issue this type of certificate.
Issuer ID—The unique Identifier (e.g. name) of the entity issuing this certificate.
Key Header—A block of information at the beginning of all keys consisting of a Variable Type, a Key ID, an Effective Date, and an Expiration Data. This information is an information tag for the key.
Key ID—A unique identifier (i.e., serial number) of a key.
Private Decryption Key—The private decryption key is a block of information which permits decryption of digital data encrypted using a corresponding public encryption key. Included are time limits on the authorized period of use of the key for data decryption.
Private Decryption Key Data—The actual private decryption key data. The exact form and content of this data is determined by the associated Variable Type.
Private Signature Key—The private signature key is a block of information which permits generation of a digital signature. This signature may be verified with a corresponding public signature key.
Private Signature Key Data—The actual private signature key data. The exact form and content of this data is determined by the associated Variable Type.
Public Encryption Key—The public encryption key is a block of information which permits encryption of data which may be decrypted only by using the corresponding Private decryption key. Included are time limits on the authorized period of use of the key for encryption.
Public Encryption Key Data—The actual public encryption key data. The exact form and content of this data is determined by the associated Variable Type.
Public Signature Key—The public signature key is a block of information which permits verification of a signature generated with a corresponding Private Signature Key. Included are time limits on the authorized period of use of the key for signature verification.
Public Signature Key Data—The actual public signature key data. The exact form and content of this data is determined by the associated Variable Type.

APPENDIX A8-continued

Field Type Definitions:

Public Signature Key ID—The Key ID of the Public Signature Key that must be used to verify this signature block.
Signature Block—A block of information located at the end of a certificate. This signature contained in this block covers all of certificate except for the Signature Date.
Signature Algorithm ID—A code identifying the specific digital signature Algorithm used to generate the Signature String contained within this Signature Block.
Signature Data—The actual digital signature data. The exact form and content is determined by the Signature Algorithm within the Signature Block.
Variable Type—A code which defines the type of a key (e.g., public signature key, Private encryption key, DES encryption/decryption key, etc.).

What is claimed is:

1. A method of establishing a cryptographic link between a registration station (rs) and an operational unit (ou) of a cryptographic system, said system comprising said rs, said ou, a master key station (mks) and a personalization station (ps), said method comprising the steps of:

(a) initializing said mks and said ps by a method comprising the steps of:
providing said mks with an encryption/decryption key pair consisting of an mks public signature key and an mks private signature key;
providing said ps with an encryption/decryption key pair consisting of a ps public signature key and a ps private signature key;
providing said ps public signature key to said mks;
providing said mks public signature key to said ps;
creating a ps certificate in said mks by a method comprising the steps of:
creating a message containing said ps public signature key and an authorization for said ps to personalize said ou; and
signing said message with said mks private signature key to create said ps certificate; and
communicating said ps certificate from said mks to said ps;

(b) personalizing said rs by a method comprising the steps of:
communicating a first copy of said ps certificate to said rs;
generating, in said ps, an encryption/decryption key pair for said rs consisting of an rs public signature key and an rs private signature key;
securely communicating said rs private signature key from said ps to said rs;
deleting said rs private signature key from said ps;
creating an rs certificate in said ps by a method comprising the steps of:
creating a message containing said rs public signature key; and
signing said message with said ps private signature key to create said rs certificate; and
communicating said rs certificate from said ps to said rs;

(c) personalizing said ou by a method comprising the steps of:
communicating a second copy of said ps certificate to said ou;
providing said mks public signature key to said ou;
verifying in said ou that said second copy of said ps certificate was signed by said mks by applying said mks public signature key;
verifying in said ou that said second copy of said ps certificate authorizes said ps to personalize said ou;
generating an encryption/decryption key pair in said ps for said ou, said encryption/decryption key pair comprising an ou public encryption key and an ou private decryption key;
securely communicating said ou private decryption key from said ps to said ou;
deleting said ou private decryption key from said ps;
creating in said ps an ou certificate for said ou by a method comprising the steps of:
creating a message containing said ou public encryption key; and
signing said message with said ps private signature key to create said ou certificate for said ou; and
communicating said ou certificate from said ps to said ou; and (d) registering said ou with said rs by a method comprising the steps of:
communicating said ou certificate to said rs;
communicating said second copy of said ps certificate to said rs;
providing said mks public signature key to said rs;
verifying in said rs that said second copy of said ps certificate was signed by said mks by applying said mks public signature key;
verifying in said rs that said ou certificate was signed by said ps by applying said ps public signature key, said ps public signature key having been obtained from said second copy of said ps certificate;
communicating said rs certificate to said ou;
communicating said first copy of said ps certificate to said ou;
verifying in said ou that said first copy of said ps certificate was signed by said mks by applying said mks public signature key;
verifying in said ou that said rs certificate was signed by said ps by applying said ps public signature key, said ps public signature key having been obtained from said first copy of said ps certificate;
generating in said rs a cryptographic data element for said ou;
encrypting said private encryption key in said ou public encryption key, said rs having obtained said ou public encryption key from said ou certificate;
communicating said cryptographic data element, encrypted in said ou public encryption key, from said rs to said ou; and
decrypting in said ou said private encryption key by applying said ou private decryption key.

2. The method of claim 1, wherein said cryptographic system comprises a communication system.

3. The method of claim 2, wherein said communication system comprises a subscriber television system.

4. The method of claim 1, wherein said rs and said ou each comprise a secure chip, said secure chip comprising a programmable processor and a read-only memory, said read-only memory containing said mks public signature key.

5. The method of claim 4, wherein said steps of verifying in said ou that said second copy of said ps certificate was signed by said mks and of verifying in said ou that said second copy of said ps certificate authorizes said ps to personalize said ou are accomplished by said programmable processor of said secure chip executing a program in said read-only memory of said secure chip.

6. The method of claim 4, wherein said message created during said method of creating said ps certificate additionally contains an effective date and an expiration date for said ps certificate, wherein said read-only memory of said secure chip additionally contains a manufacturing date code, and wherein said method for personalizing said ou additionally comprises the step of:

verifying in said ou that said manufacturing date code in said read-only memory of said secure chip is between said effective date and said expiration date for said ps certificate.

7. A method of using a first unit and a fourth unit to establish a cryptographic link between a second unit and a third unit of a cryptographic system, said second unit and said third unit being connected by a communication link, said method comprising the steps of:

generating a public key pair comprising a first public key and a corresponding first private key, said first public key being stored in said first, second, and third units;

generating in said fourth unit a second public key pair comprising a second public key and a second private key;

generating a certificate in said fourth unit comprising a statement of authorization designating said first unit as authorized to generate a third public key pair;

digitally signing said certificate in said fourth unit using said first private key;

securely communicating said digitally signed certificate to said first unit utilizing said second public key pair;

generating in said first unit said third public key pair consisting of a third public key and a third private key;

securely communicating said third private key and said digitally signed certificate from said first unit to said second unit;

applying said first public signature key to said certificate to verify that said certificate was signed by said fourth unit;

reading said message in said certificate to determine whether said first unit has been authorized to provide said public key pair; and, deleting said third private key from said first unit;

communicating said third public key to said third unit; and communicating private messages from said third unit to said second unit using said third public key pair.

8. The method of claim 7, wherein said cryptographic system comprises a communication system.

9. The method of claim 8, wherein said communication system comprises a subscriber television system.

10. The method of claim 7, wherein said second unit comprises a secure chip, said secure chip comprising a programmable processor and a read only memory, said read only memory containing said first public signature key.

11. The method of claim 10, wherein said certificate additionally contains an effective date and an expiration date for said certificate, wherein said read-only memory of said secure chip additionally contains a manufacturing date code, and wherein said reading step additionally comprises the step of:

verifying that said manufacturing date code in said read-only memory of said secure chip is between said effective date and said expiration date for said certificate.

12. The method of claim 11, wherein said reading step is implemented in a program in said read-only memory of said secure chip and wherein said program in said read-only memory is executed by said programmable processor in said secure chip.

13. The method of claim 7, wherein said third public key pair is a digital signature key pair.

14. The method of claim 7, wherein one of said private messages comprises a cryptographic data element.

15. A first unit of a public key cryptosystem, said public key cryptosystem comprising said first unit, a second unit, a third unit and a trusted authority, said trusted authority authorizing said third unit to provide said first unit with a public key and a corresponding private key, said third unit generating said public key and said private key for said first unit, said first unit comprising a communication circuit for establishing a cryptographic link with said second unit by providing said second unit with said public key from said third unit, said communication circuit comprising a secure circuit, said secure circuit containing a program for determining whether said third unit has been authorized by said trusted authority to provide said public key and said private key, said communication circuit receiving said private key from said third unit only after said secure circuit has executed said program to determine that said third unit has been authorized by said trusted authority to provide said public key and said private key.

16. The first unit of claim 15, wherein said secure circuit comprises a secure integrated circuit, wherein said secure integrated circuit comprises a programmable processor and a read-only memory, wherein said read-only memory contains said program, and wherein said program is executed by said programmable processor.

17. The first unit of claim 15, wherein said first unit functions primarily as a communication unit.

18. A method of authentication in a public key cryptosystem, said public key cryptosystem comprising a trusted authority, a first unit and a second unit, said trusted authority having a first public signature key and a corresponding first private signature key, said method being executed by said first unit to authenticate said second unit, said second unit having a second public signature key and a corresponding second private signature key, said method comprising the steps of:

storing said first public signature key in a permanent storage location inside said first unit by manufacturing a read only memory using a mask containing said first public signature key of said trusted authority and installing said read only memory in said first unit;

obtaining a chain of one or more authentication certificates linking said second unit to said trusted authority, each of said authentication certificates being generated by an authority to authenticate a subject of the certificate, each authority having a public signature key and a corresponding private signature key, each subject having a public signature key and a corresponding private signature key, each of said authentication certificates containing the public signature key of the respective subject of the certificate and being signed by the respective authority of the certificate using the private signature key of the authority, a first authentication certificate of said chain being generated by said trusted authority, each subsequent authentication certificate of said chain, if any, being generated by the subject of the previous authentication certificate, a last authentication certificate of said chain authenticating said second unit;

checking said first authentication certificate of said chain of authentication certificates by a method comprising the steps of:

verifying that said first authentication certificate has been signed by said trusted authority by applying said first public signature key obtained from said permanent storage location inside said first unit; and verifying that said first authentication certificate contains the public signature key of the subject of the first authentication certificate; and checking each subsequent authentication certificate, if any, of said chain of authentication certificates by a method comprising the steps of:

obtaining the public signature key of the authority of the subsequent authentication certificate from the previous authentication certificate;

verifying that the subsequent authentication certificate has been signed by the authority of said subsequent authentication certificate by applying said public signature key of said authority of said subsequent authentication certificate; and verifying that the subsequent authentication certificate contains the public signature key of the subject of the subsequent authentication certificate.

19. The method of claim 18, wherein said public key cryptosystem comprises a communication system.

20. The method of claim 19, wherein said communication system comprises a subscriber television system.

21. The method of claim 18, wherein each of said authentication certificates additionally contains a data value indicating a function that the subject of the certificate will be authorized to perform and an effective date and an expiration date for the certificate.

providing said second public key of said second unit to said first unit from a certificate in said second chain of authentication certificates; and providing said first public key of said first unit to said second unit from a certificate in said first chain of authentication certificates.

22. A method of establishing a cryptographic link between a first unit and a second unit of a cryptographic system, said cryptographic system comprising said first unit, said second unit and a trusted authority, said trusted authority having a public signature key and a corresponding private signature key, said method comprising the steps of:

providing said first unit with a first public key pair consisting of a first public key and a first private key, where said first public key is suitable for encrypting messages and said first private key is suitable for decrypting messages;

providing said second unit with a second public key pair consisting of a second public key and a second private key;

providing said second unit with a first chain of authentication certificates linking said first unit to said trusted authority, said first chain of authentication certificates authenticating said first public key of said first unit;

providing said first unit with a second chain of authentication certificates linking said second unit to said trusted authority, said second chain of authentication certificates authenticating said second public key of said second unit;

authenticating said first unit, in said second unit, by applying an appropriate public signature key to each of the certificates in said first chain of certificates, in part by retrieving said public signature key of said trusted authority from a permanently programmed location in a read-only memory in said second unit that has been fabricated with a mask containing said public signature key;

authenticating said second unit, in said first unit, by applying an appropriate public signature key to each of the certificates in said second chain of certificates, in part by retrieving said public signature key of said trusted authority from a permanently programmed location in a read-only memory in said first unit that has been fabricated with a mask containing said public signature key;

providing said second public key of said second unit to said first unit from a certificate in said second chain of authentication certificates; and providing said first public key of said first unit to said second unit from a certificate in said first chain of authentication certificates.

23. The method of claim 22, wherein said cryptographic system comprises a communication system.

24. The method of claim 23, wherein said communication system comprises a subscriber television system.

25. The method of claim 22, wherein said second private key of said second unit is suitable for creating digital signatures and said second public key of said second unit is suitable for verifying digital signatures.

26. The method of claim 22, wherein said second unit comprises a secure integrated circuit containing a programmable processor.

27. The method of claim 26, wherein the authentication of said first unit is accomplished by said processor in said secure integrated circuit of said second unit by executing a program contained in said read-only memory of said secure integrated circuit of said second unit.

28. The method of claim 22, wherein said system additionally comprises a third unit, wherein said third unit provides said first unit with said first public key pair, and wherein said third unit provides said second unit with said second public key pair.

29. The method of claim 22, wherein each of said certificates in said first chain of authentication certificates and each of said certificates in said second chain of authentication certificates comprises:

a data value indicating a function that a subject of the certificate will be authorized to perform;

an effective date for the certificate;

an expiration date for the certificate; and an initial key package.

30. A method of establishing a cryptographic link between a first unit and a second unit in a cryptographic system, said second unit being remotely located from said first unit, said second unit being connected to said first unit by a communication link, said second unit having a public key pair consisting of a public key and a private key, said method comprising the steps of:

providing said public key of said second unit to said first unit;

generating, in said first unit, a first cryptographic data element for use with said second unit;

encrypting, in said first unit, said first cryptographic data element using said public key of said second unit;

communicating said first cryptographic data element, encrypted in said public key, from said first unit to said second unit;

communicating an authorization message from said first unit to said second unit;

verifying in said second unit that said first unit has been authorized by a trusted authority to generate cryptographic data elements;

decrypting, in said second unit, said first cryptographic data element by applying said private key; and communicating private messages between said first unit and said second unit using said first cryptographic data element.

31. The method of claim 30, wherein said cryptographic system comprises a communication system.

32. The method of claim 31, wherein said communication system comprises a subscriber television system.

33. The method of claim 30, wherein the use of said first cryptographic data element for the communication of private messages between said first unit and said second unit establishes a secure cryptographic link.

34. The method of claim 30, wherein said trusted authority has a first public signature key and a corresponding first private signature key, wherein said first unit has a second public signature key and a corresponding second private signature key, and wherein said method of establishing a cryptographic link between said first unit and said second unit additionally comprises the steps of:

providing said first unit with a first chain of authentication certificates originating with said trusted authority, said first chain of authentication certificates authenticating said public key of said second unit;

providing said second unit with a second chain of authentication certificates originating with said trusted authority, said second chain of authentication certificates authenticating said second public signature key of said first unit;

authenticating said second unit, using said first unit, by applying an appropriate public signature key to each of the certificates in said first chain of certificates, beginning with said first public signature key of said trusted authority; and authenticating said first unit, using said second unit, by applying an appropriate public signature key to each of the certificates in said second chain of certificates, beginning with said first public signature key of said trusted authority.

35. A cryptographic system comprising a first unit, a second unit, a third unit, and a fourth unit, said first and second units communicating securely by utilizing at least one cryptographic data element, said cryptographic data element being generated by said third unit, said third unit communicating said cryptographic data element to said first and second units, and also communicating to said second unit an authorization certificate received from said fourth unit, such that said second unit verifies that said third unit has been authorized by said fourth unit to generate said cryptographic data element.

* * * * *

UNITED STATES PATENT AND TRADEMARK OFFICE
CERTIFICATE OF CORRECTION

PATENT NO. : 5,787,172

DATED : July 28, 1998

INVENTOR(S) : Terry Sutton Arnold

It is certified that error appears in the above-identified patent and that said Letters Patent is hereby corrected as shown below:

Claim 21, column 43, lines 28-33, delete "providing said second public key of said second unit to said first unit from a certificate in said second chain of authentication certificates; and providing said first public key of said first unit to said second unit from a certificate in said first chain of authentication certificates."

Signed and Sealed this

Sixth Day of June, 2000

Attest:

Q. TODD DICKINSON

*Attesting Officer*   *Director of Patents and Trademarks*